US012568512B2

(12) United States Patent
Dong et al.

(10) Patent No.: US 12,568,512 B2
(45) Date of Patent: Mar. 3, 2026

(54) METHOD AND APPARATUS FOR DETERMINING SIDELINK TRANSMISSION RESOURCE

(71) Applicant: Huawei Technologies Co., Ltd., Shenzhen (CN)

(72) Inventors: Lei Dong, Shanghai (CN); Hongjia Su, Shanghai (CN); Wenting Guo, Shenzhen (CN); Chang He, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 282 days.

(21) Appl. No.: 18/300,944

(22) Filed: Apr. 14, 2023

(65) Prior Publication Data

US 2023/0254878 A1 Aug. 10, 2023

Related U.S. Application Data

(63) Continuation of application No. PCT/CN2020/121691, filed on Oct. 16, 2020.

(51) Int. Cl.
*H04W 72/40* (2023.01)
*H04W 72/0446* (2023.01)
(Continued)

(52) U.S. Cl.
CPC ....... *H04W 72/40* (2023.01); *H04W 72/0446* (2013.01); *H04W 72/54* (2023.01); *H04W 76/14* (2018.02); *H04W 92/18* (2013.01)

(58) Field of Classification Search
CPC . H04W 72/0446; H04W 72/40; H04W 76/14; H04W 72/54; H04W 92/18
See application file for complete search history.

(56) References Cited

U.S. PATENT DOCUMENTS 11,695,516 B2 * 7/2023 Huang ................. H04L 1/1864
370/312
2020/0029340 A1 1/2020 He et al.
(Continued)

FOREIGN PATENT DOCUMENTS

CN 108633098 A 10/2018
CN 109804682 A 5/2019
(Continued)

OTHER PUBLICATIONS

3GPP TS 38.214 V16.3.0 (Sep. 2020), 3rd Generation Partnership Project; Technical Specification Group Radio Access Network; NR; Physical layer procedures for data (Release 16), 166 pages.
(Continued)

*Primary Examiner* — Raj Jain
(74) *Attorney, Agent, or Firm* — Slater Matsil, LLP

(57) ABSTRACT

This application provides a method and an apparatus for determining a sidelink transmission resource, and may be applied to systems such as the Internet of vehicles, V2X, and V2V. The method includes: determining a first time domain resource set in a resource selection window; monitoring a second time domain resource set corresponding to the first time domain resource set; and performing resource exclusion and/or resource reporting before a time unit of a first candidate resource, or in the time unit of the first candidate resource, or in a time unit in which resource determining is triggered, where the first time domain resource set is for sidelink transmission, and the first candidate resource is the 1st resource in time domain in the first time domain resource set.

20 Claims, 17 Drawing Sheets

(51) Int. Cl.

| | |
|---|---|
| *H04W 72/54* | (2023.01) |
| *H04W 76/14* | (2018.01) |
| *H04W 92/18* | (2009.01) |

(56) References Cited

U.S. PATENT DOCUMENTS

| | | | |
|---|---|---|---|
| 2020/0314804 A1 | 10/2020 | Shin et al. | |
| 2021/0099901 A1* | 4/2021 | Huang | H04W 72/12 |
| 2023/0254878 A1* | 8/2023 | Dong | H04W 72/0446 |
| 2023/0254883 A1* | 8/2023 | Li | H04L 1/08 |
| | | | 370/329 |
| 2024/0008028 A1* | 1/2024 | Jiang | H04W 24/08 |
| 2024/0340926 A1* | 10/2024 | Zhang | H04W 72/541 |

FOREIGN PATENT DOCUMENTS

| | | | |
|---|---|---|---|
| CN | 110603869 A | 12/2019 | |
| CN | 110662262 A | 1/2020 | |
| CN | 111294752 A | 6/2020 | |
| CN | 111432498 A | 7/2020 | |
| WO | 2017176095 A1 | 10/2017 | |
| WO | 2017179286 A1 | 10/2017 | |
| WO | 2018175528 A1 | 9/2018 | |
| WO | 2020029067 A1 | 2/2020 | |

OTHER PUBLICATIONS

3GPP TS 38.331 V16.2.0 (Sep. 2020), 3rd Generation Partnership Project;Technical Specification Group Radio Access Network; NR; Radio Resource Control (RRC) protocol specification (Release 16), 921 pages.

Lenovo et al., "Sidelink resource allocation for Power saving", 3GPP TSG RAN WG1 #102-e, R1-2005839, E-meeting, Aug. 17-28, 2020, 7 pages.

NTT Docomo Inc., "Discussion on sidelink resource allocation for power saving", 3GPP TSG RAN WG1 #102, R1-2006747, e-Meeting, Aug. 17-28, 2020, 6 pages.

* cited by examiner

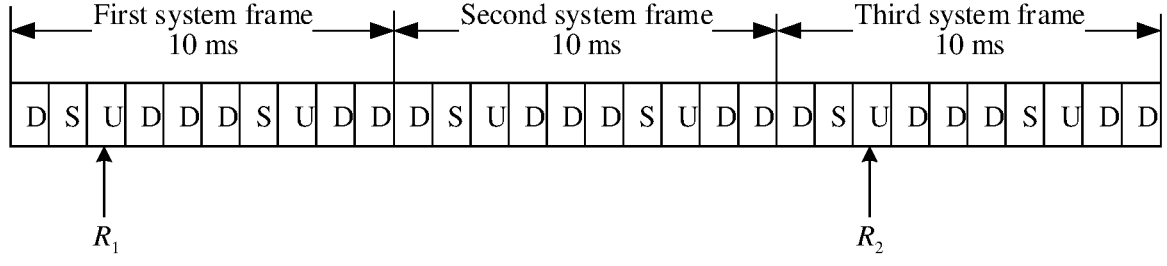
FIG. 4
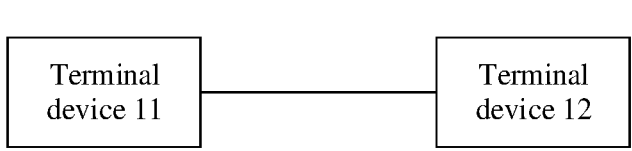
FIG. 5
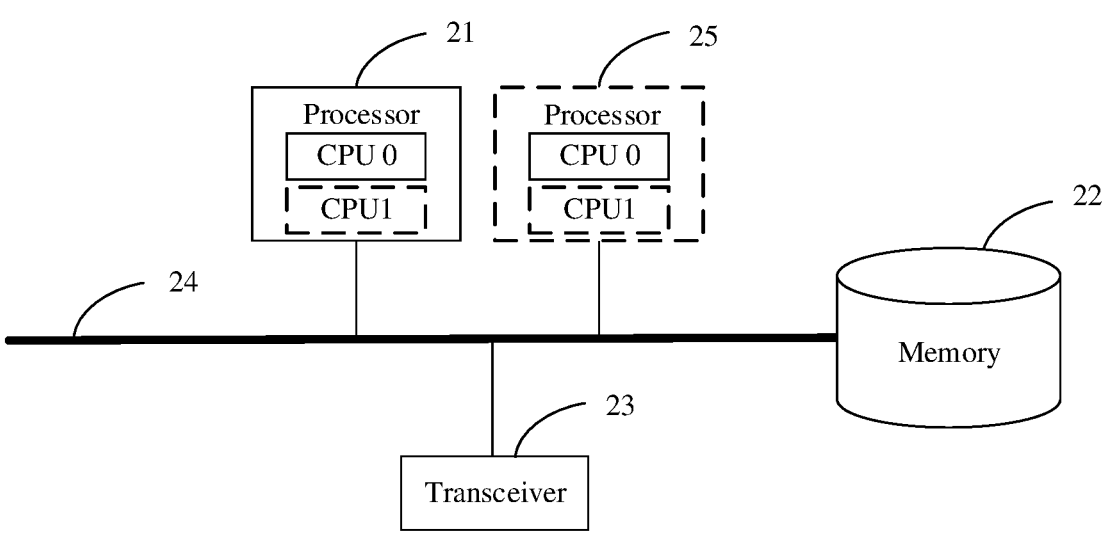
FIG. 6
FIG. 7

60

70

80

METHOD AND APPARATUS FOR DETERMINING SIDELINK TRANSMISSION RESOURCE

CROSS-REFERENCE TO RELATED APPLICATIONS

This application is a continuation of International Application No. PCT/CN2020/121691, filed on Oct. 16, 2020, the disclosure of which is hereby incorporated by reference in its entirety.

TECHNICAL FIELD

Embodiments of this application relate to the field of communication technologies, and in particular, to a method and an apparatus for determining a sidelink transmission resource.

BACKGROUND

With development of wireless communication technologies, people have increasing requirements for a high data rate and user experience, and have increasing requirements for a proximity service for knowing and communicating with people or things around. Therefore, a device-to-device (D2D) technology emerges. A transmission link in D2D may be referred to as a sidelink (SL).

In sidelink transmission, user equipment (UE) determines a transmission resource for communication in the following steps: Step 1: Determine a resource set (which may be referred to as a first resource set) in a resource selection window. The resource selection window may be understood as a range of available resources when the UE transmits to-be-transmitted information based on a sidelink. The first resource set includes one or more candidate resources, and each candidate resource can be used by the UE to transmit information. Step 2: Monitor monitoring resources corresponding to resources in the first resource set (where a set of monitoring resources corresponding to the resources in the first resource set may be referred to as a second resource set). A monitoring resource corresponding to one resource is a resource on which the resource can be reserved. Step 3: Determine, from the resource set based on a result of the monitoring in step 2, a resource for communication.

In the foregoing process, some resources in the second resource set may be located after some resources in the first resource set. In this case, if the some resources in the second resource set are monitored, some resources in the first resource set expire, thereby reducing utilization efficiency of candidate resources.

SUMMARY

This application provides a method and an apparatus for determining a sidelink transmission resource. The method and the apparatus may be applied to the Internet of vehicles, for example, vehicle to everything (V2X) communication, a long term evolution-vehicle (LTE-V), or vehicle to vehicle (V2V) communication, or may be applied to fields such as intelligent driving and intelligent connected vehicle, to improve resource utilization during determining of a sidelink transmission resource.

According to a first aspect, a method for determining a sidelink transmission resource is provided, including: determining a first time domain resource set in a resource selection window; monitoring a second time domain resource set corresponding to the first time domain resource set; and performing resource exclusion and/or resource reporting before a time unit of a first candidate resource, or in the time unit of the first candidate resource, or in a time unit in which resource determining is triggered, where the first time domain resource set is for sidelink transmission, and the first candidate resource is the $1^{st}$ resource in time domain in the first time domain resource set.

In the foregoing method, resource exclusion and/or resource reporting is performed before the time unit of the first candidate resource, or in the time unit of the first candidate resource, or in the time unit in which resource determining is triggered. In this way, a problem that some candidate resources become expired resources because a monitoring resource is located after some time domain resources in the first time domain resource set can be avoided. In this way, utilization efficiency of candidate resources is improved, interference of a system is reduced, and a throughput of the system is improved.

In a possible design, the monitoring a second time domain resource set corresponding to the first time domain resource set includes: performing monitoring in first duration, where the first duration T' meets the following relationship:

$$T_{y1}-m \leq T' < n-P_0, \text{ where}$$

$T_{y1}$ is the time unit of the first candidate resource, m is a preconfigured parameter or a parameter determined through configuration signaling, n is the time unit in which resource determining is triggered, and $P_0$ is first preset duration.

A value of $P_0$ may be related to a processing time required for performing SCI decoding.

In other words, the first duration T' may include a first time unit and a sidelink time unit between the first time unit and a second time unit. The first time unit is a time unit (that is, $T_{y1}-m$) before the time unit of the first candidate resource with an interval of m from the time unit of the first candidate resource. The second time unit is a time unit before the time unit in which resource determining is triggered with an interval of first preset duration (that is, $n-P_0$) from the time unit in which resource determining is triggered.

In a scenario in which a retransmission resource reserved by another terminal device is monitored, in the foregoing design, monitoring is performed within the first duration, so that a monitoring resource corresponding to the retransmission resource reserved by the another terminal device can be monitored, and a problem that the monitoring resource is located after the candidate resource is also avoided.

In a possible design, the monitoring a second time domain resource set corresponding to the first time domain resource set includes: performing monitoring in second duration, where the second duration T" meets the following relationship:

$$T_{y1}-m \leq T'' < T_{y1}-P_1, \text{ where}$$

$T_{y1}$ is the time unit of the first candidate resource, m is a preconfigured parameter or a parameter determined through configuration signaling, and $P_1$ is a second preset duration.

In other words, the second duration T" may include a first time unit and a time unit between the first time unit and a third time unit. The first time unit is a time unit (that is, $T_{y1}-m$) before the time unit of the first candidate resource with an interval of m from the time unit of the first candidate resource, and the third time unit is a time unit before the time unit of the first candidate resource with an interval of second preset duration (that is, $T_{y1}-P_1$) from the time unit of the first candidate resource.

In a scenario in which a retransmission resource reserved by another terminal device is monitored, in the foregoing design, monitoring is performed within the second duration, so that a monitoring resource corresponding to the retransmission resource reserved by the another terminal device can be monitored, and a problem that the monitoring resource is located after the candidate resource is also avoided.

In a possible design, the method further includes: ending the monitoring before $n-P_0$, where n is the time unit in which resource determining is triggered, and $P_0$ is the first preset duration.

In other words, the method further includes ending the monitoring before the second time unit. The second time unit is a time unit before the time unit in which resource determining is triggered with an interval of first preset duration (that is, $n-P_0$) from the time unit in which resource determining is triggered.

In a scenario in which a periodically reserved resource of another terminal device is monitored, in the foregoing design, monitoring is ended before $n-P_0$, so as to avoid a problem that when a monitoring resource corresponding to a periodic reservation is monitored, the monitoring resource may be located after the candidate resource.

In a possible design, in the method, the time unit $T_{end}$ in which monitoring on the second time domain resource set is ended meets the following relationship:

$$T_{end} \leq n-P_0, \text{ where}$$

$P_0$ is the first preset duration, and n is the time unit in which resource determining is triggered.

A value of $P_0$ may be related to a processing time required for performing SCI decoding.

In other words, the time unit $T_{end}$ in which monitoring on the second time domain resource set is ended is located in the second time unit or before the second time unit. The second time unit is a time unit before the time unit in which resource determining is triggered with an interval of first preset duration (that is, $n-P_0$) from the time unit in which resource determining is triggered.

In a scenario in which a periodically reserved resource of another terminal device is monitored, in the foregoing design, a time unit $T_{end}$ of ending the monitoring on the second time domain resource set is located before $n-P_0$, so as to avoid a problem that when a monitoring resource corresponding to a periodic reservation is monitored, the monitoring resource may be located after the candidate resource.

In a possible design, the method further includes: ending the monitoring before $T_{y1}-P_1$, In other words, the monitoring is ended before the third time unit. The third time unit is a time unit that is before the time unit in which resource determining is triggered with an interval of second preset duration (that is, $T_{y1}-P_1$) from the time unit of the first candidate resource.

In a scenario in which a periodically reserved resource of another terminal device is monitored, in the foregoing design, monitoring is ended before $T_{y1}-P_1$, so as to avoid a problem that when a monitoring resource corresponding to a periodic reservation is monitored, the monitoring resource may be located after the candidate resource.

In a possible design, in this design, the time unit $T_{end}$ in which monitoring on the second time domain resource set is ended meets the following relationship:

$$T_{end} \leq T_{y1}-P_1, \text{ where}$$

$T_{y1}$ is the time unit of the first candidate resource, $P_1$ is second preset duration, and $P_1$ is second preset duration.

In other words, the time unit $T_{end}$ in which monitoring on the second time domain resource set is ended is located in the third time unit or before the third time unit. The third time unit is a time unit that is before the time unit in which resource determining is triggered with an interval of second preset duration (that is, $T_{y1}-P_1$) from the time unit of the first candidate resource.

A value of $P_1$ may be related to one or more of a processing time required for performing SCI decoding, a processing time required for resource exclusion, a processing time required for reporting a resource exclusion result to a higher layer (for example, a MAC layer), a processing time required for the higher layer to complete a final resource selection procedure, and a processing time required for preparing to-be-transmitted information.

In a scenario in which a periodically reserved resource of another terminal device is monitored, in the foregoing design, a time unit $T_{end}$ of ending the monitoring on the second time domain resource set is located before $T_{y1}-P_1$, so as to avoid a problem that when a monitoring resource corresponding to a periodic reservation is monitored, the monitoring resource may be located after the candidate resource.

In a possible design, the performing resource exclusion and/or resource reporting before a time unit of a first candidate resource includes: performing resource exclusion and/or resource reporting in a time unit $T_{y1}-P_2$, where $T_{y1}$ is the time unit of the first candidate resource, and $P_2$ is third preset duration.

In other words, the performing resource exclusion and/or resource reporting before a time unit of a first candidate resource includes: performing resource exclusion and/or resource reporting in a fourth time unit. The fourth time unit is a time unit before the time unit of the first candidate resource with an interval of third preset duration from the first candidate resource.

A value of $P_2$ may be related to one or more of a processing time required for performing SCI decoding, a processing time required for resource exclusion, a processing time required for reporting a resource exclusion result to a higher layer (for example, a MAC layer), a processing time required for the higher layer to complete a final resource selection procedure, and a processing time required for preparing to-be-transmitted information.

In the foregoing design, it is ensured that a resource selection process is completed before the time unit of the first candidate resource, so as to send data.

According to a second aspect, a method for determining a sidelink transmission resource is provided, including: determining a first time domain resource set in a resource selection window; and monitoring a second time domain resource set corresponding to the first time domain resource set, where the second time domain resource set is located before the first time domain resource set, and the first time domain resource set is for sidelink transmission.

In the method, when each first time domain resource in the first time domain resource set is determined in the resource selection window, a time domain resource whose corresponding monitoring resources are all located before the first time domain resource set is selected as the first time domain resource, that is, a set of monitoring resources (that is, the second time domain resource set) corresponding to all first time domain resources in the first time domain resource set is located before the first time domain resource set. In this way, a problem that some candidate resources become expired resources because a monitoring resource is located after some time domain resources in the first time domain resource set can be avoided.

In a possible design, the method further includes: ending the monitoring before the time unit n for triggering resource determining.

In the foregoing design, it is considered that after the monitoring ends, processes, such as resource exclusion and/or resource reporting, further need to be performed based on a result of the monitoring. Therefore, the monitoring is ended before the time unit in which resource determining is triggered, so that a time can be reserved for subsequent processes such as resource exclusion and/or resource reporting, to prevent some candidate resources in the first time domain resource set from becoming expired resources.

In a possible design, that the monitoring on the second time domain resource set is ended before the time unit in which resource determining is triggered may mean that the time unit $T_{end}$ in which the monitoring on the second time domain resource set is ended meets the following relationship:

$$T_{end} \leq n - P_0, \text{ where}$$

$P_0$ is first preset duration, and n is a time unit in which resource determining is triggered.

In other words, the time unit $T_{end}$ in which the monitoring on the second time domain resource set is ended is located before the second time unit. The second time unit is a time unit (that is, $n-P_0$) of first preset duration before the time unit in which resource determining is triggered.

$P_0$ may be preconfigured in a communication apparatus, or may be delivered by a network device to an apparatus through configuration signaling. A value of $P_0$ may be related to a processing time required for performing SCI decoding.

In a possible design, the first time domain resource set is located before a third time domain resource, and the third time domain resource is located after the time unit in which resource determining is triggered with an interval of fourth preset duration from the time unit in which resource determining is triggered.

In other words, a distance between a time unit of the last time domain resource in the first time domain resource set and the time unit in which resource determining is triggered is less than the fourth preset duration.

A value of the fourth preset duration $P_3$ may be related to at least one of a size of a minimum resource reservation period $P_{gap\_min}$ in a period set $\phi_B$ or a processing time $T_{proc,0}$ required for performing SCI decoding. The period set $\phi_B$ is a resource reservation period set that is configured for a sidelink resource pool and that is for a partial sensing resource selection mode.

In the foregoing design, a distance between a time unit of the last time domain resource in the first time domain resource set and the time unit in which resource determining is triggered is less than the fourth preset duration, so that a periodically reserved monitoring resource can be avoided from being located after the time unit in which resource determining is triggered, thereby avoiding a case in which the periodically reserved monitoring resource is located after the candidate resource.

In a possible design, the monitoring a second time domain resource set corresponding to the first time domain resource set includes:

performing monitoring in first duration, where the first duration T' meets the following relationship:

$$T_{y1} - m \leq T' < n - P_0, \text{ where}$$

$T_{y1}$ is a time unit of a first candidate resource, the first candidate resource is the $1^{st}$ resource in time domain in the first time domain resource set, m is a preconfigured parameter or a parameter determined through configuration signaling, n is a time unit in which resource determining is triggered, and $P_0$ is first preset duration.

A value of $P_0$ may be related to a processing time required for performing SCI decoding.

In other words, the first duration T' may include a first time unit and a sidelink time unit between the first time unit and a second time unit. The first time unit is a time unit (that is, $T_{y1} - m$) before the time unit of the first candidate resource with an interval of m from the time unit of the first candidate resource. The second time unit is a time unit before the time unit in which resource determining is triggered with an interval of first preset duration (that is, $n-P_0$) from the time unit in which resource determining is triggered.

In a possible design, an interval between the time unit $T_{y1}$ of the first candidate resource in the first time domain resource set and $n-P_0$ is less than m. For definitions and values of m, $P_0$, and n, refer to the foregoing descriptions.

In a possible design, the method further includes: ending the monitoring before the time unit of the first candidate resource.

When each first time domain resource in the first time domain resource set is determined in the resource selection window, a time domain resource whose corresponding monitoring resources are all located before the first time domain resource set is selected as the first time domain resource.

In the foregoing implementation design, it is considered that after the monitoring is ended, processes, such as resource exclusion and/or resource reporting, further need to be performed based on a result of the monitoring. Therefore, the monitoring is ended before the time unit of the first candidate resource, so that a time can be reserved for subsequent processes, such as resource exclusion and/or resource reporting, to prevent some candidate resources in the first time domain resource set from becoming expired resources.

In a possible design, in the method, that the monitoring on the second time domain resource set is ended before the time unit of the first candidate resource may mean that a time unit $T_{end}$ in which the monitoring on the second time domain resource set is ended meets the following relationship:

$$T_{end} \leq T_{y1} - P_1, \text{ where}$$

$T_{y1}$ is the time unit of the first candidate resource, and $P_1$ is second preset duration, where $P_1 \neq 0$.

In other words, the time unit $T_{end}$ in which the monitoring on the second time domain resource set is ended is located before the third time unit. The third time unit is a time unit of second preset duration (that is, $T_{y1} - P_1$) before the time unit of the first candidate resource.

$P_1$ may be preconfigured in a communication apparatus, or may be delivered by a network device to an apparatus through configuration signaling. A value of $P_1$ may be related to one or more of a processing time required for resource exclusion, a processing time required for reporting a resource exclusion result to a higher layer (for example, a MAC layer), a processing time required for the higher layer to complete a final resource selection procedure, a time required for sending to-be-transmitted information, and a processing time required for performing SCI decoding.

In a possible design, the first time domain resource set is located before a fourth time domain resource, the fourth time domain resource is located after the first candidate resource with an interval of fifth preset duration from the first candidate resource, and the first candidate resource is the $1^{st}$ resource in time domain in the first time domain resource set.

In other words, a distance between a time unit of the last time domain resource in the first time domain resource set and the time unit of the first candidate resource is less than the fifth preset duration.

A value of the fifth preset duration $P_4$ may be related to one or more of a processing time required for resource exclusion, a processing time required for reporting a resource exclusion result to a higher layer (for example, a MAC layer), a processing time required for the higher layer to complete a final resource selection procedure, a time required for sending to-be-transmitted information, a size of a minimum period $P_{gap}$ in a period set $\phi_B$, and a processing time $T_{proc,0}$ required for performing SCI decoding. The period set $\phi_B$ is a resource reservation period set that is configured for a sidelink resource pool and that is for a partial sensing resource selection mode.

In the foregoing design, a distance between a time unit of the last time domain resource in the first time domain resource set and the time unit of the first candidate resource is less than the fifth preset duration, so as to avoid a case in which a periodically reserved monitoring resource is located after the candidate resource.

In a possible design, the monitoring a second time domain resource set corresponding to the first time domain resource set includes: performing monitoring in second duration, where the second duration T'' meets the following relationship:

$$T_{y1}-m \leq T'' < T_{y1}-P_1, \text{ where}$$

$T_{y1}$ is a time unit of a first candidate resource, the first candidate resource is the $1^{st}$ resource in time domain in the first time domain resource set, m is a preconfigured parameter or a parameter determined through configuration signaling, and $P_1$ is second preset duration.

In other words, the second duration T'' includes a time unit between a first time unit and a third time unit. The first time unit is a time unit (that is, $T_{y1}-m$) before the time unit of the first candidate resource with an interval of m from the first candidate resource, and the third time unit is a time unit (that is, $T_{y1}-P_1$) before the time unit of the first candidate resource with an interval of second preset duration from the first candidate resource.

In a possible design, in the method, an interval between the time unit $T_{y1}$ of the first candidate resource in the first time domain resource set and $T_{y1}-P_1$ is less than m. It may also be understood that in this method, $P_1$ is less than m. For definitions and values of m and $P_1$, refer to the foregoing descriptions.

An interval between the time unit of the first candidate resource in the first time domain resource set and $T_{y1}-P_1$ is less than m, so that it can be ensured that a reservation of a retransmission resource on another terminal device is sensed.

According to a third aspect, a method for determining a sidelink transmission resource is provided, including: determining a first time domain resource set in a resource selection window; excluding, when a first monitoring resource is after a moment n for triggering resource determining or after a first candidate resource, a second candidate resource corresponding to the first monitoring resource from the first time domain resource set; and monitoring a second time domain resource set corresponding to remaining time domain resources in the first time domain resource set. The first time domain resource set is for sidelink transmission, and the first candidate resource is the $1^{st}$ resource in time domain in the first time domain resource set.

In the foregoing method, when the first monitoring resource is after the moment n for triggering resource determining or after the first candidate resource, the second candidate resource corresponding to the first monitoring resource is excluded from the first time domain resource set, so as to ensure that the second time domain resource set does not include a time domain resource located after the moment n for triggering resource determining or the time domain resource in the first resource set, thereby avoiding a problem that some candidate resources are discarded, and improving utilization of candidate resources included in the first resource set. In addition, because the second time domain resource set does not include a time domain resource located after the moment n for triggering resource determining or after a time domain resource in the first resource set, a time domain resource located after the moment n for triggering resource determining or after a time domain resource in the first resource set does not need to be monitored, so that a resource for sending data can be selected as early as possible, thereby reducing a delay of sending data.

In a possible design, the method further includes: determining a fourth candidate resource set from a third candidate resource set based on a result of the monitoring; and determining, from the fourth candidate resource set and the second candidate resource set based on a priority corresponding to the fourth candidate resource set and a priority corresponding to the second candidate resource set, or based on a probability corresponding to the fourth candidate resource set and a probability corresponding to the second candidate resource set, a resource for information transmission. The second candidate resource set is a set of candidate resources of monitoring resources that are after a time unit in which resource determining is triggered or a time unit of the first candidate resource, and the third candidate resource set is a set of remaining time domain resources in the first time domain resource set.

The foregoing design can improve utilization efficiency of candidate resources.

According to a fourth aspect, an apparatus for determining a sidelink transmission resource is provided. The apparatus for determining a sidelink transmission resource can implement the method in the first aspect or any possible design of the first aspect, and therefore, can also achieve beneficial effects in the first aspect or any possible design of the first aspect. The apparatus for determining a sidelink transmission resource may be a terminal device, or may be an apparatus that can support a terminal device in implementing the method according to the first aspect or any possible implementation of the first aspect, for example, a chip used in the terminal device. The apparatus may implement the foregoing method via software or hardware, or by executing corresponding software by hardware.

The apparatus includes: a processing unit, configured to determine a first time domain resource set in a resource selection window; and a transceiver unit, configured to monitor a second time domain resource set corresponding to the first time domain resource set. The processing unit is further configured to perform resource exclusion and/or control the transceiver unit to perform resource reporting before a time unit of a first candidate resource, or in the time unit of the first candidate resource, or in a time unit in which resource determining is triggered. The first time domain resource set is for sidelink transmission, and the first candidate resource is the $1^{st}$ resource in time domain in the first time domain resource set.

Optionally, the transceiver unit is specifically configured to perform monitoring in first duration, and the first duration T' meets the following relationship:

$$T_{y1}-m \le T' \le n-P_0, \text{ where}$$

$T_{y1}$ is the time unit of the first candidate resource, m is a preconfigured parameter, n is the time unit in which resource determining is triggered, and $P_0$ is first preset duration.

Optionally, the transceiver unit is specifically configured to perform monitoring in second duration, and the second duration T" meets the following relationship:

$$T_{y1}-m \le T'' < T_{y1}-P_1, \text{ where}$$

$T_{y1}$ is the time unit of the first candidate resource, m is a preconfigured parameter, and $P_1$ is second preset duration.

Optionally, that the processing unit is further configured to perform resource exclusion and/or resource reporting before a time unit of a first candidate resource includes:

the processor is further configured to perform resource exclusion and/or resource reporting in a time unit $T_{y1}-P_2$, where $T_{y1}$ is the time unit of the first candidate resource, and $P_2$ is third preset duration.

According to a fifth aspect, an apparatus for determining a sidelink transmission resource is provided. The apparatus for determining a sidelink transmission resource may implement the method in the second aspect or any possible design of the second aspect, and therefore, can also achieve beneficial effects in the second aspect or any possible design of the second aspect. The apparatus for determining a sidelink transmission resource may be a terminal device, or may be an apparatus that can support a terminal device in implementing the method according to the second aspect or any possible implementation of the second aspect, for example, a chip used in the terminal device. The apparatus may implement the foregoing method via software or hardware, or by executing corresponding software by hardware.

The apparatus includes a processing unit, configured to determine a first time domain resource set in a resource selection window; and a transceiver unit, configured to monitor a second time domain resource set corresponding to the first time domain resource set. The second time domain resource set is located before the first time domain resource set, and the first time domain resource set is for sidelink transmission.

Optionally, the transceiver unit is further configured to end the monitoring before a time unit n for triggering resource determining.

Optionally, the first time domain resource set is located before a third time domain resource, and the third time domain resource is located after the time unit in which resource determining is triggered with an interval of fourth preset duration from the time unit in which resource determining is triggered.

Optionally, the transceiver unit is specifically configured to perform monitoring in first duration, and the first duration T' meets the following relationship:

$$T_{y1}-m \le T' \le n-P_0, \text{ where}$$

$T_{y1}$ is a time unit of a first candidate resource, the first candidate resource is the $1^{st}$ resource in time domain in the first time domain resource set, m is a preconfigured parameter, n is a time unit in which resource determining is triggered, and $P_0$ is first preset duration.

Optionally, the transceiver unit is further configured to end the monitoring before the time unit of the first candidate resource.

Optionally, the first time domain resource set is located before a fourth time domain resource, the fourth time domain resource is located after the first candidate resource with an interval of fifth preset duration from the first candidate resource, and the first candidate resource is the $1^{st}$ resource in time domain in the first time domain resource set.

Optionally, the transceiver unit is specifically configured to perform monitoring in second duration, and the second duration T" meets the following relationship:

$$T_{y1}-m \le T'' < T_{y1}-P_1, \text{ where}$$

$T_{y1}$ is the time unit of the first candidate resource, the first candidate resource is the $1^{st}$ resource in time domain in the first time domain resource set, m is a preconfigured parameter, and $P_1$ is second preset duration.

According to a sixth aspect, an apparatus for determining a sidelink transmission resource is provided. The apparatus for determining a sidelink transmission resource may implement the method in the third aspect or any possible design of the third aspect, and therefore, can also achieve beneficial effects in the third aspect or any possible design of the third aspect. The apparatus for determining a sidelink transmission resource may be a terminal device, or may be an apparatus that can support a terminal device in implementing the method according to the third aspect or any possible implementation of the third aspect, for example, a chip used in the terminal device. The apparatus may implement the foregoing method via software or hardware, or by executing corresponding software by hardware.

The apparatus for determining sidelink transmission resource includes: a processing unit, configured to determine a first time domain resource set in a resource selection window, where the processing unit is further configured to exclude, when a first monitoring resource is after a moment n for triggering resource determining or a first candidate resource, a second candidate resource corresponding to the first monitoring resource from the first time domain resource set; and the transceiver unit, configured to monitor a second time domain resource set corresponding to remaining time domain resources in the first time domain resource set. The first time domain resource set is for sidelink transmission, and the first candidate resource is the $1^{st}$ resource in time domain in the first time domain resource set.

Optionally, the processing unit is further configured to determine a fourth candidate resource set from a third candidate resource set based on a result of the monitoring. The processing unit is further configured to determine, from the fourth candidate resource set and a second candidate resource set based on a priority corresponding to the fourth candidate resource set and a priority corresponding to the second candidate resource set, a resource for transmitting information. Alternatively, the processing unit is further configured to determine, from the fourth candidate resource set and a second candidate resource set based on a probability corresponding to the fourth candidate resource set and a probability corresponding to the second candidate resource set, a resource for transmitting information. The second candidate resource set is a set of candidate resources of monitoring resources that are after the time unit in which resource determining is triggered or the time unit of the first candidate resource, and the third candidate resource set is a set of the remaining time domain resources in the first time domain resource set.

According to a seventh aspect, an apparatus for determining a sidelink transmission resource is provided. The apparatus includes a processor and a memory. The memory stores a computer program, and the processor executes the computer program stored in the memory, to enable the apparatus to perform the method according to the first aspect and possible designs, the method according to the second aspect and possible designs, or the method according to the third aspect and possible designs.

According to an eighth aspect, an apparatus for determining a sidelink transmission resource is provided, including: a processor and an interface circuit. The interface circuit is configured to receive code instructions and transmit the code instructions to the processor. The processor is configured to run the code instructions, to perform the method according to the first aspect and possible designs, the method according to the second aspect and possible designs, or the method according to the third aspect and possible designs.

According to a ninth aspect, a computer-readable storage medium is provided. The computer-readable storage medium is configured to store instructions. When the instructions are executed, the method according to the first aspect and possible designs, the method according to the second aspect and possible designs, or the method according to the third aspect and the possible designs is implemented.

According to a tenth aspect, a computer program product is provided. The computer program product includes instructions. When the computer program product is run on a computer, the computer is enabled to perform the method according to the first aspect and possible designs, the method according to the second aspect and possible designs, or the method according to the third aspect and the possible designs.

According to an eleventh aspect, a system is provided, including the apparatus for determining a sidelink transmission resource according to the seventh aspect or the eighth aspect and a network device.

For technical effects brought by any design method in the fourth aspect to the twelfth aspect, refer to technical effects brought by different design manners in the first aspect to the seventh aspect. Details are not described herein again.

Figure 2:
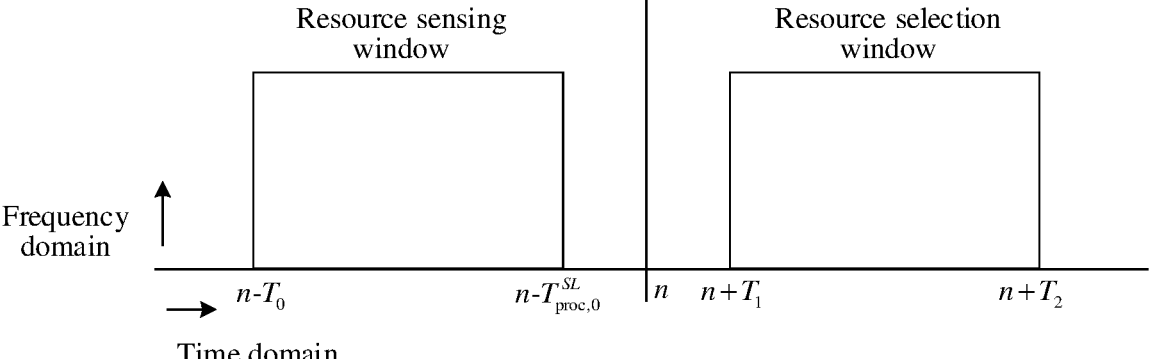
Figure 3:
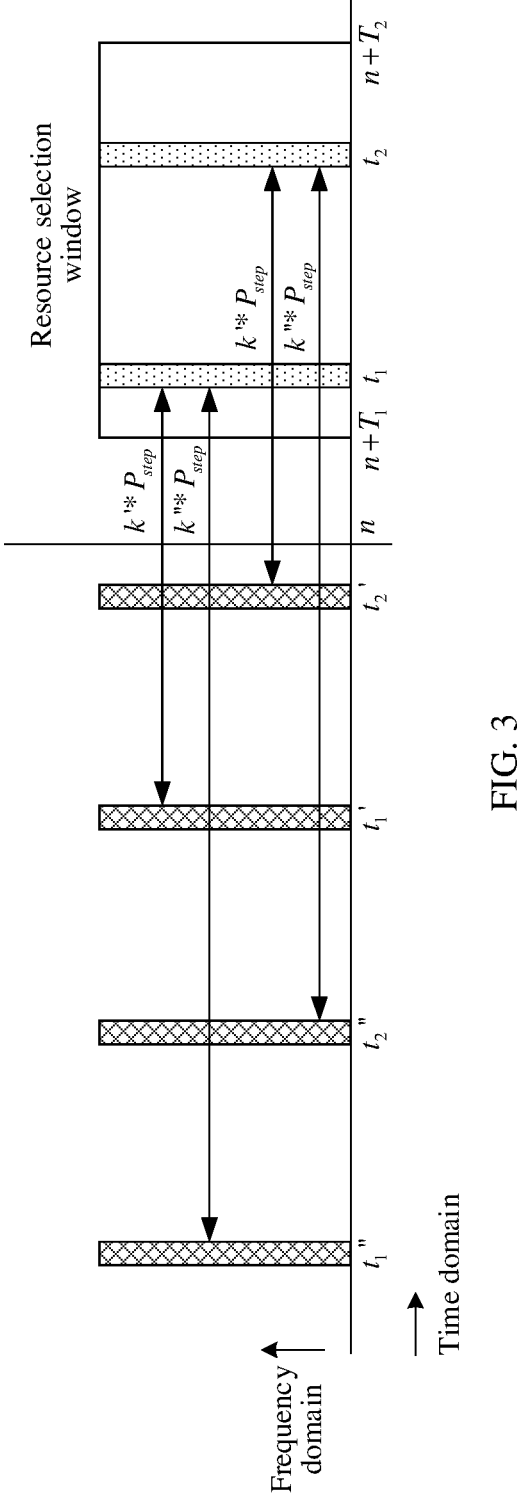
Figure 8:
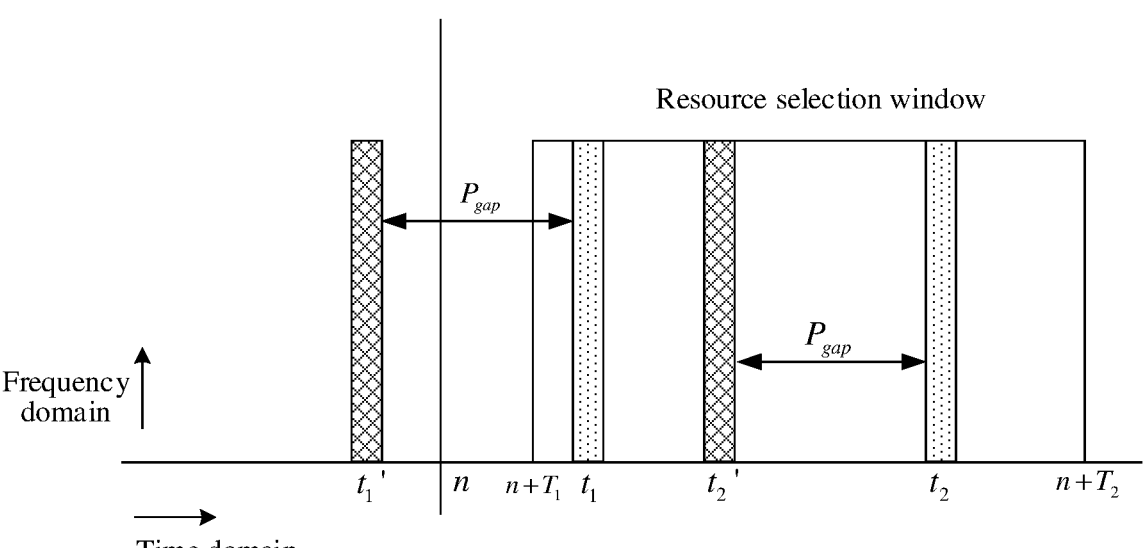
Figure 9:
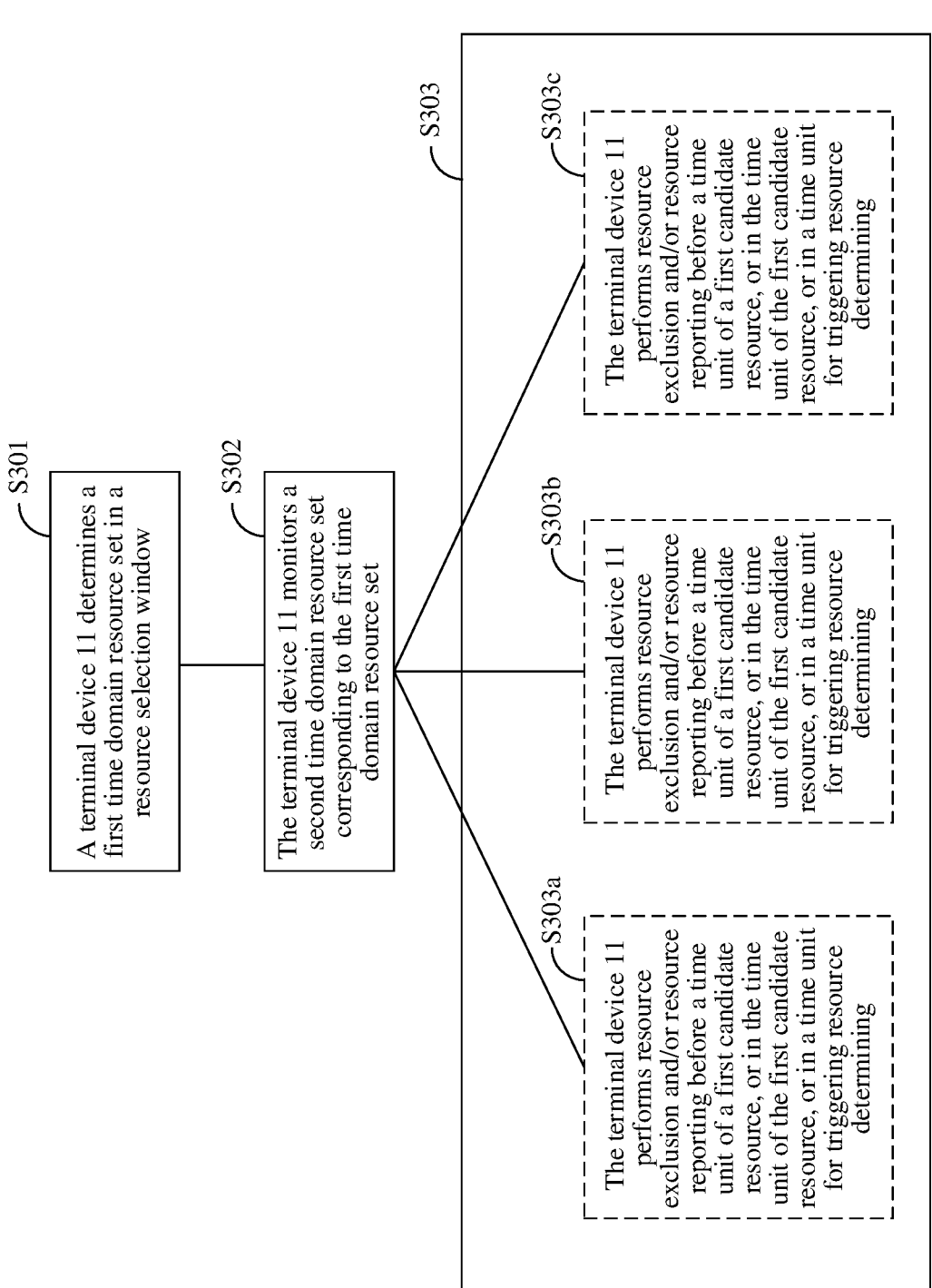
Figure 10:
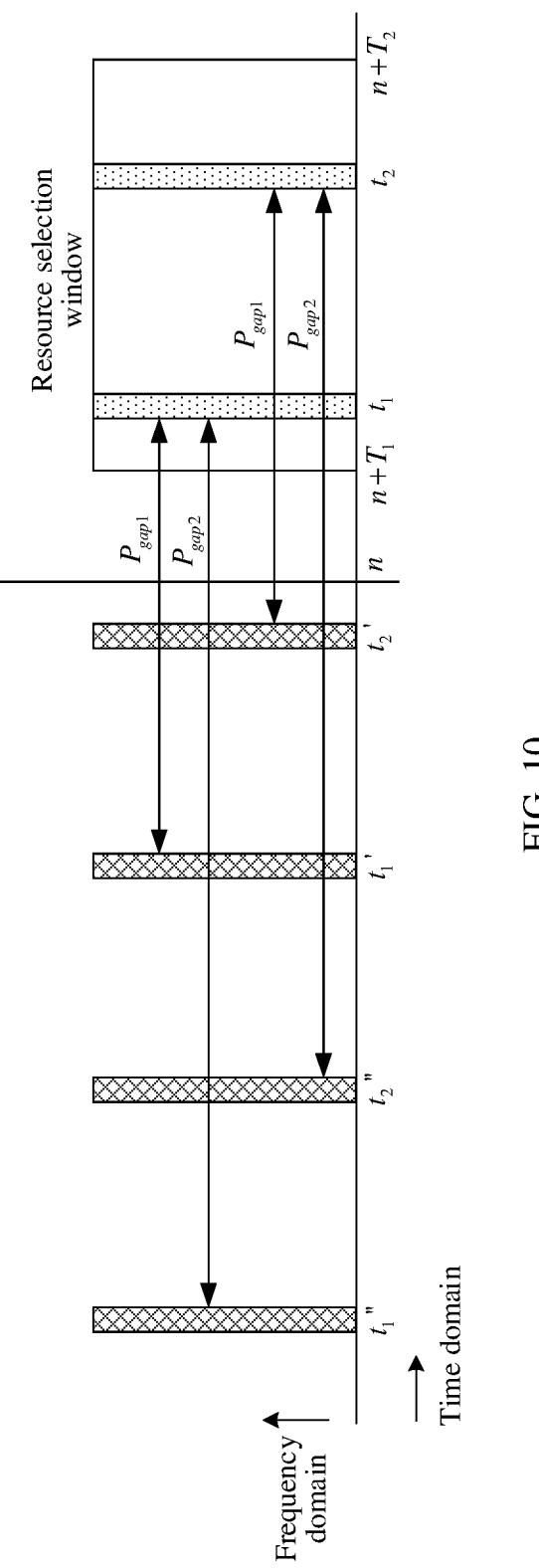
Figure 11:
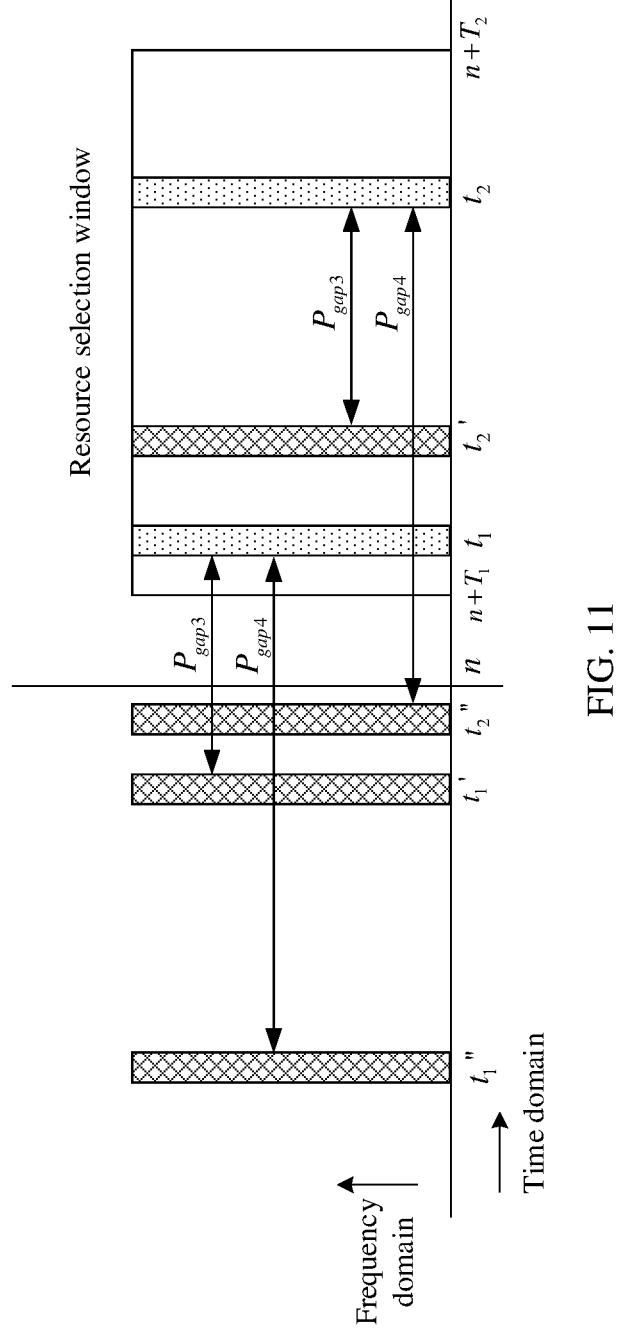
Figure 12A:
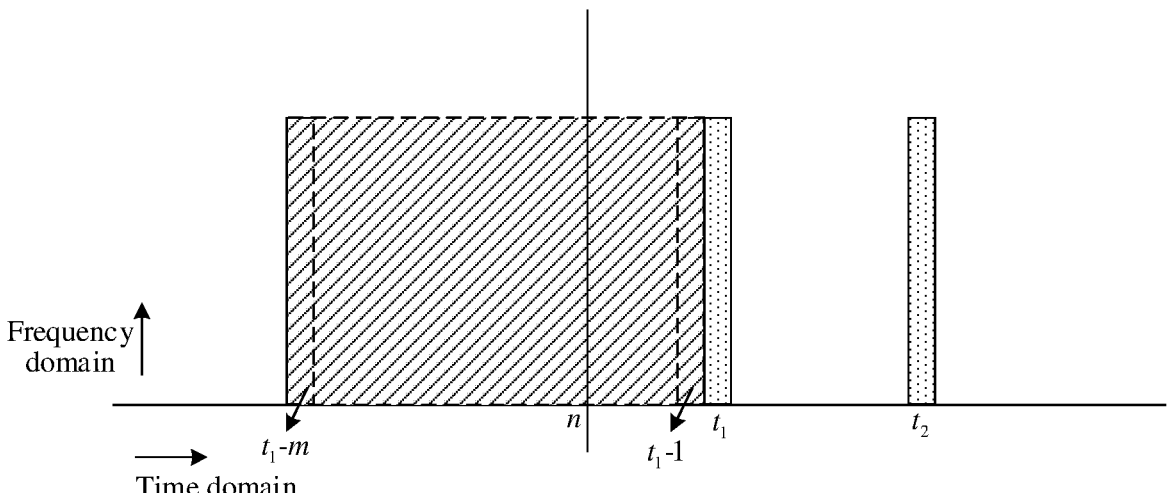
Figure 12B:
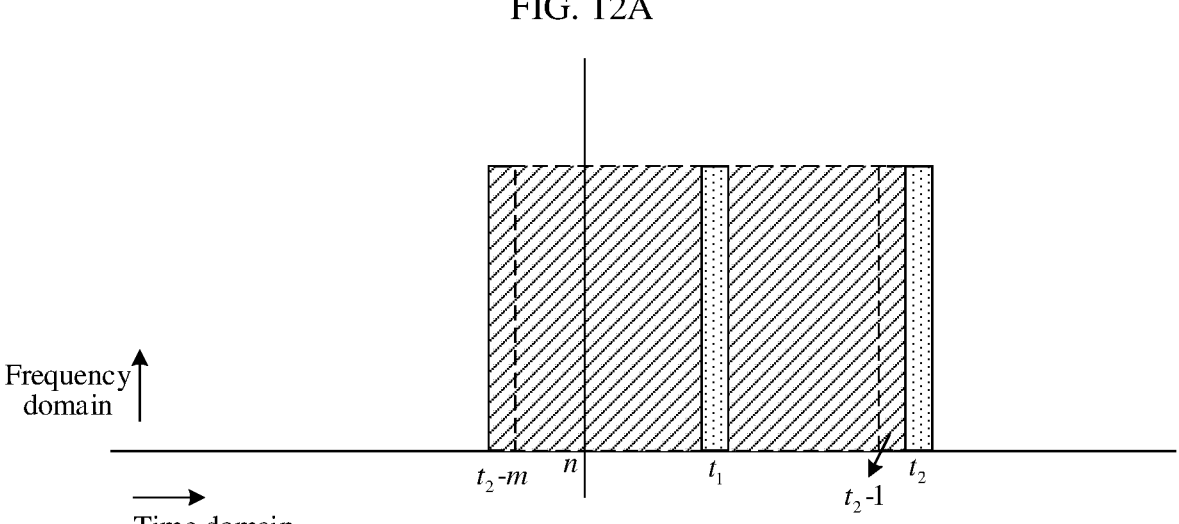
Figure 13:
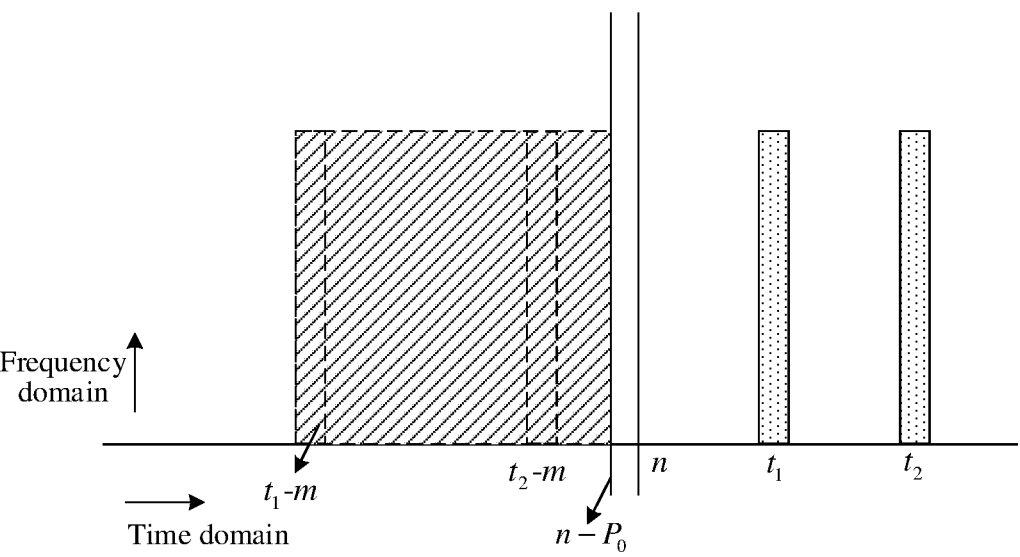
Figure 14:
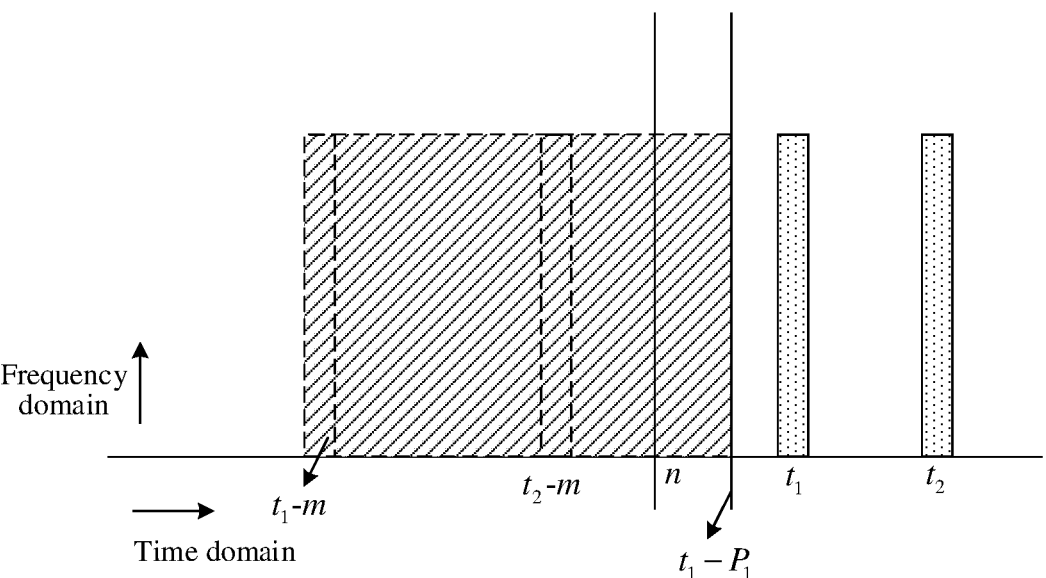
Figure 15:
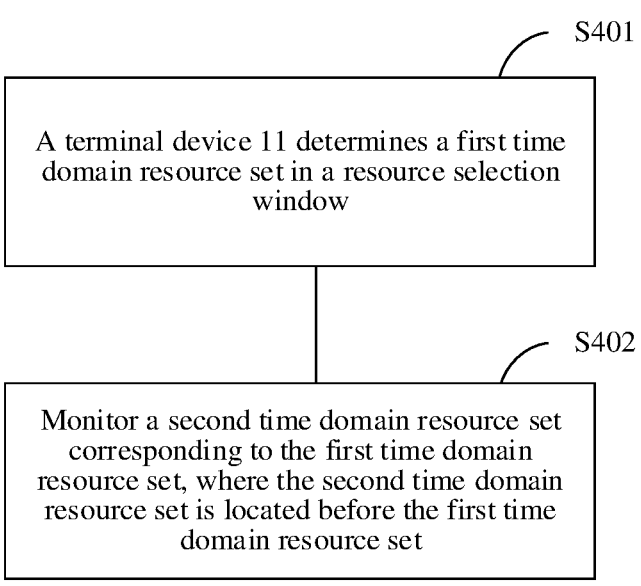
Figure 16:
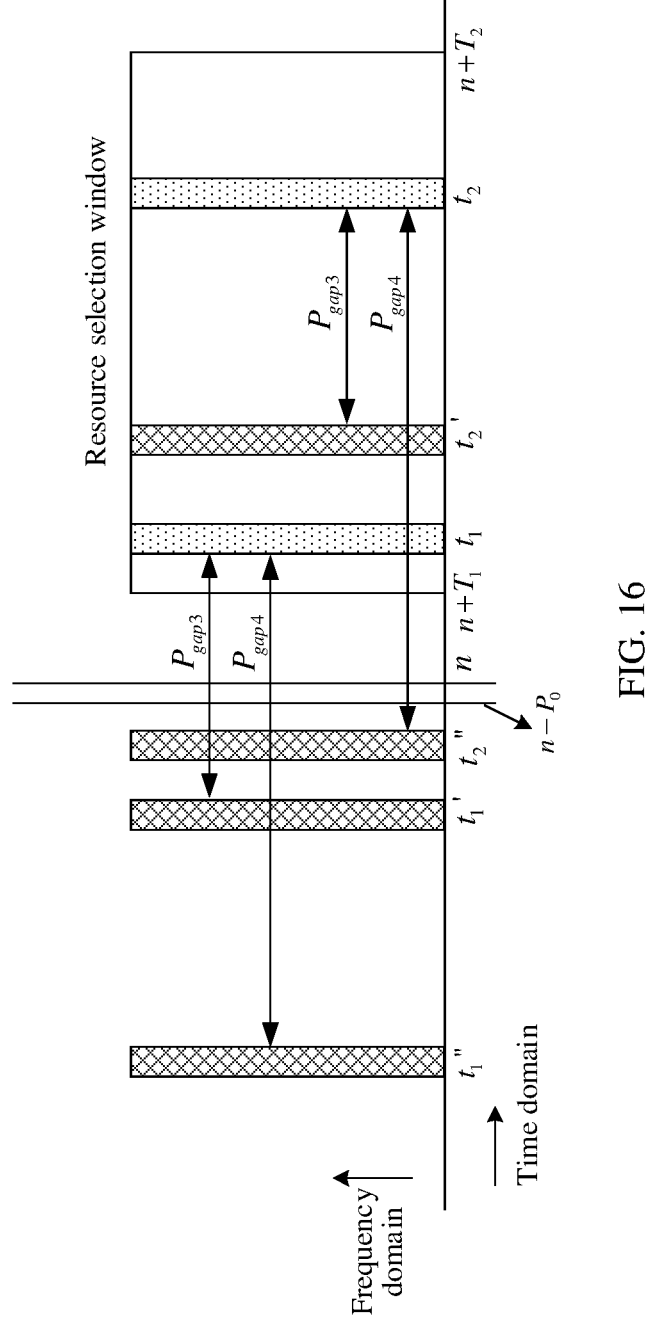
Figure 17:
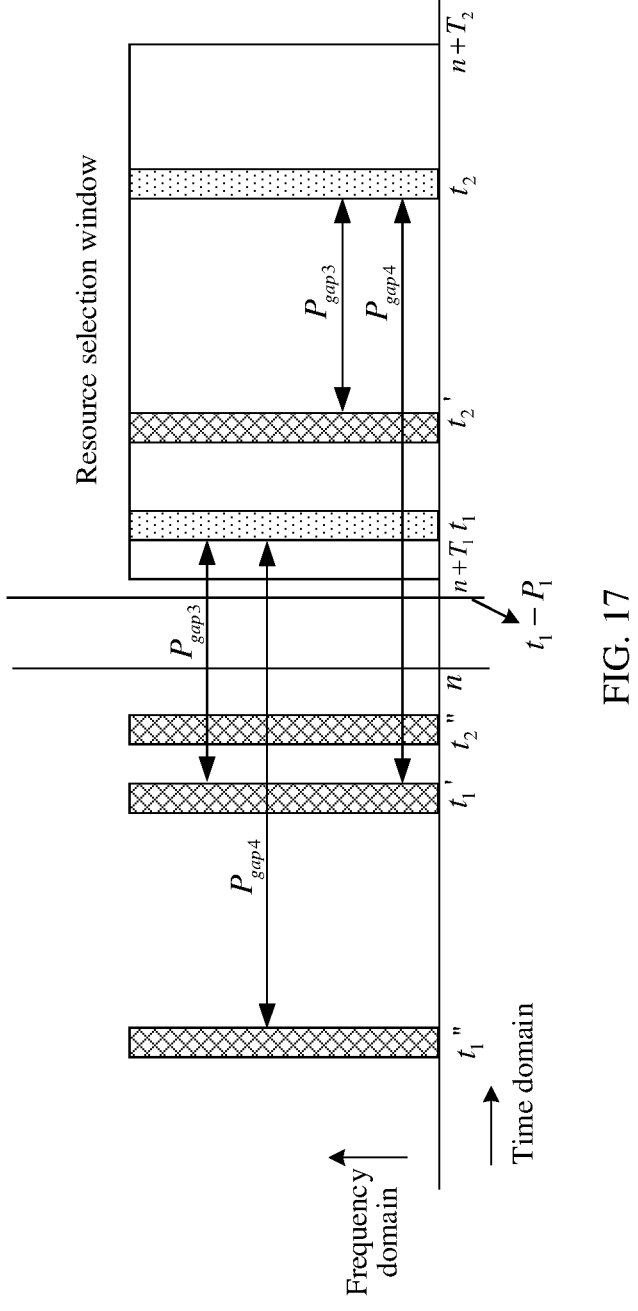
Figure 18:
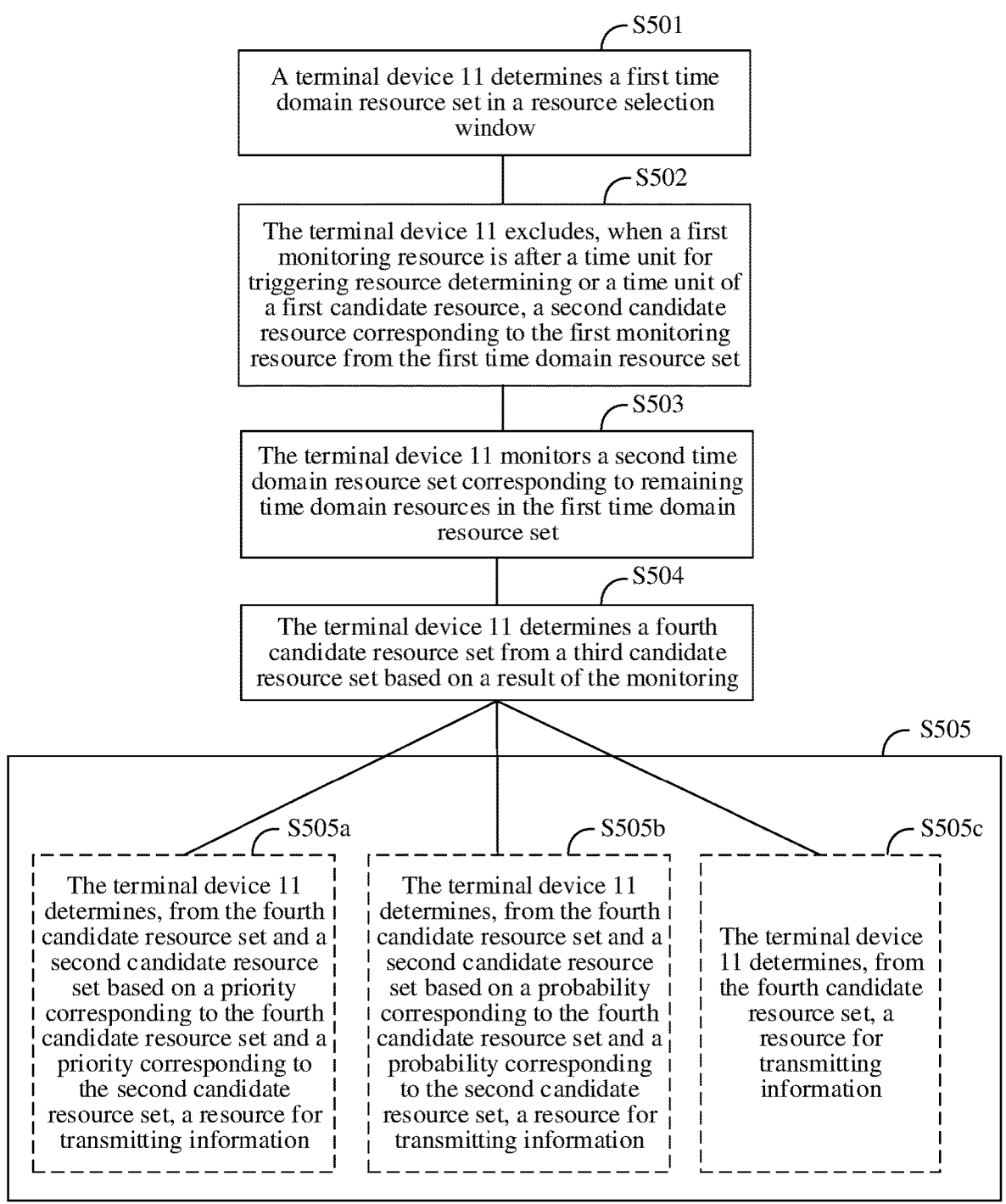
Figure 19:
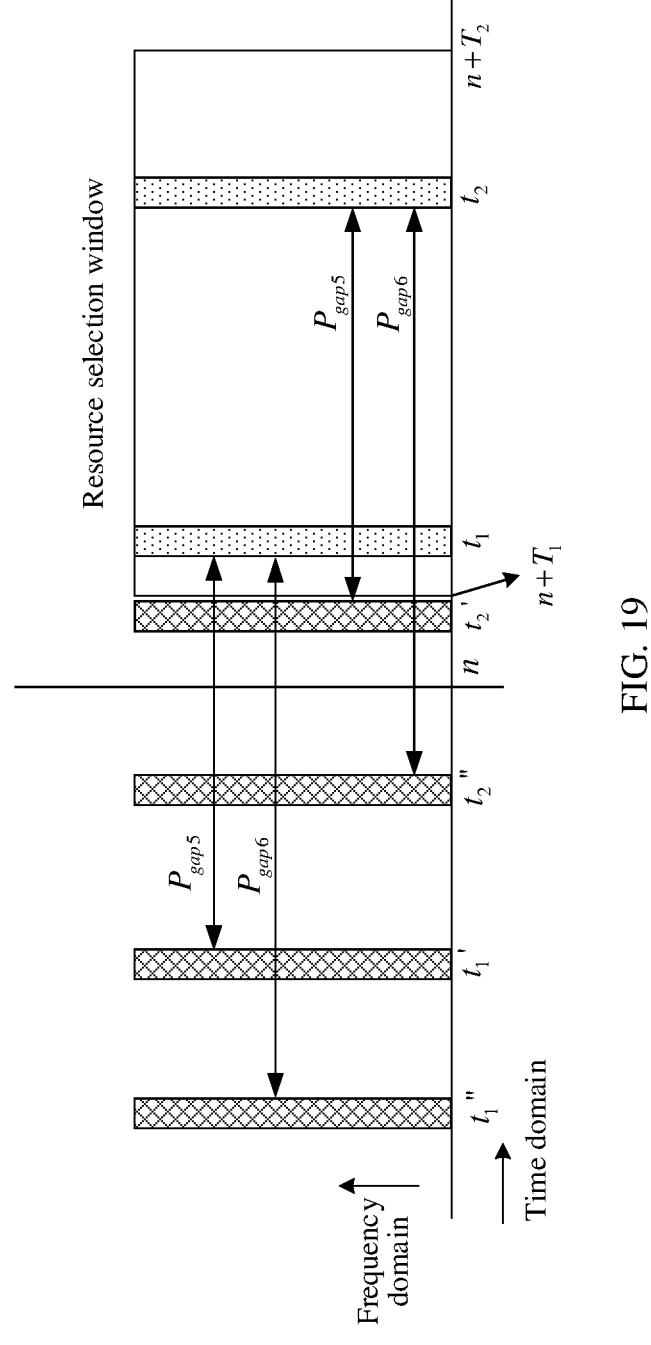
Figure 20:
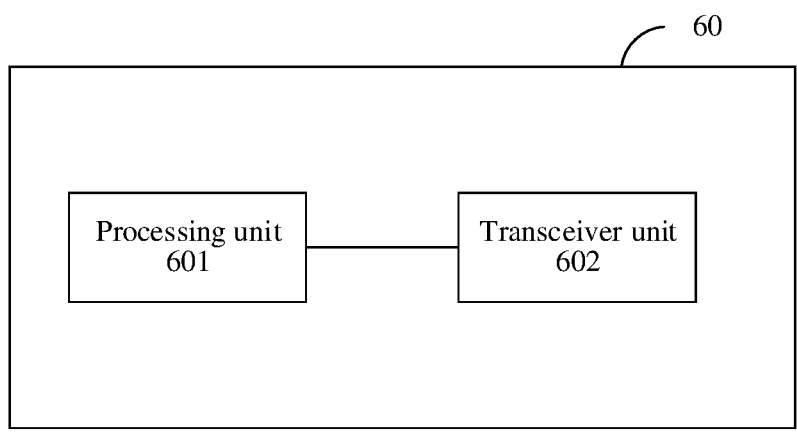
Figure 21:
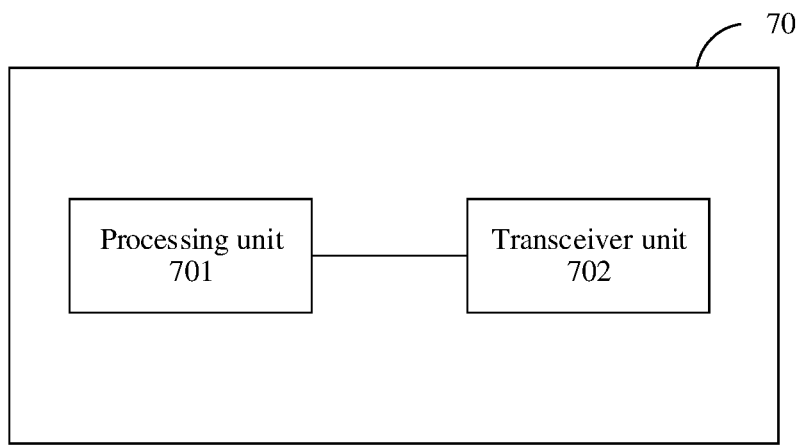
Figure 22:
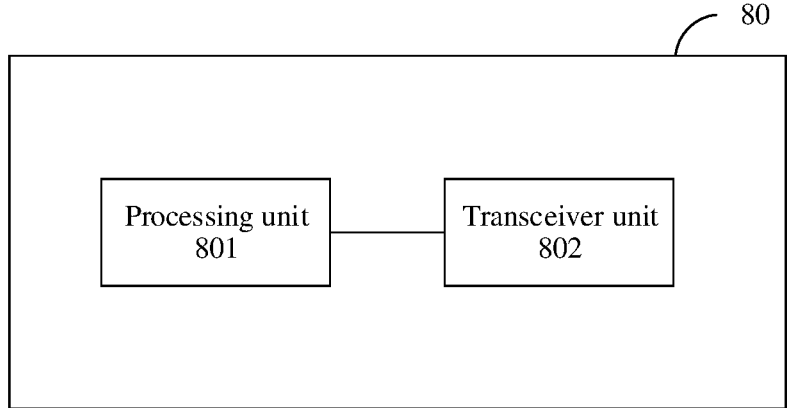
Figure 23:
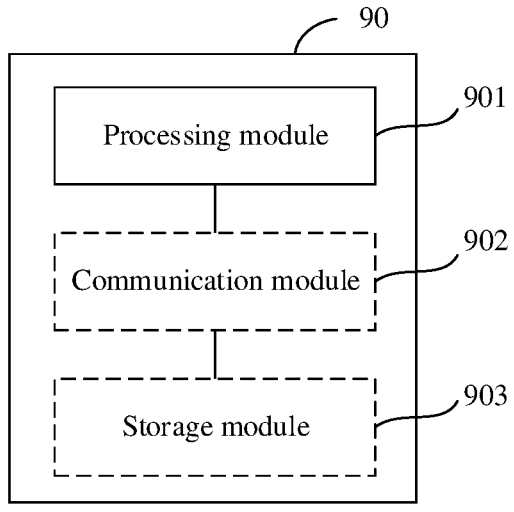
Figure 24:
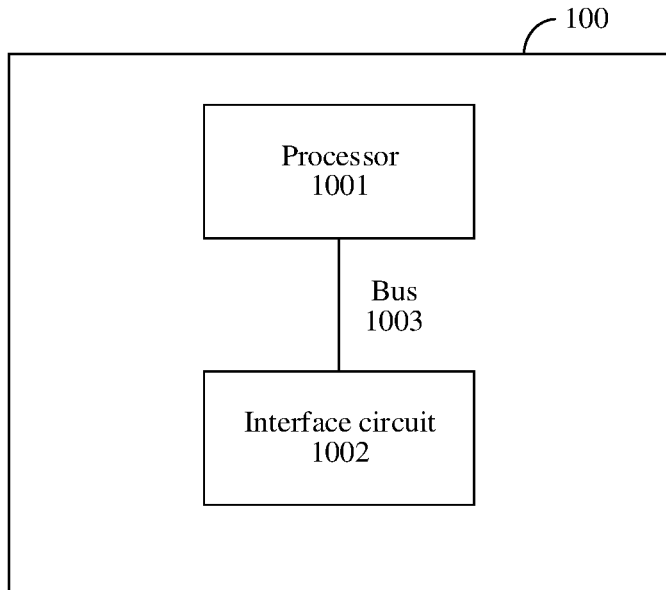

FIG. B is a schematic diagram of a subchannel in a frequency domain resource according to an embodiment of this application;

FIG. 2 is a schematic diagram of a time-frequency resource according to an embodiment of this application;

FIG. 3 is a schematic diagram of another time-frequency resource according to an embodiment of this application;

FIG. 4 is a schematic diagram of transmission of a system frame according to an embodiment of this application;

FIG. 5 is a schematic diagram of subframes occupied by a sidelink resource pool according to an embodiment of this application;

FIG. 6 is a schematic diagram of a communication system according to an embodiment of this application;

FIG. 7 is a schematic diagram of a hardware structure of a communication device according to an embodiment of this application;

FIG. 8 is a schematic diagram of another time-frequency resource according to an embodiment of this application;

FIG. 9 is a schematic flowchart of a method for determining a sidelink resource according to an embodiment of this application;

FIG. 10 is a schematic diagram of another time-frequency resource according to an embodiment of this application;

FIG. 11 is a schematic diagram of another time-frequency resource according to an embodiment of this application;

FIG. 12A is a schematic diagram of another time-frequency resource according to an embodiment of this application;

FIG. 12B is a schematic diagram of another time-frequency resource according to an embodiment of this application;

FIG. 13 is a schematic diagram of another time-frequency resource according to an embodiment of this application;

FIG. 14 is a schematic diagram of another time-frequency resource according to an embodiment of this application;

FIG. 15 is a schematic flowchart of another method for determining a sidelink resource according to an embodiment of this application;

FIG. 16 is a schematic diagram of another time-frequency resource according to an embodiment of this application;

FIG. 17 is a schematic diagram of another time-frequency resource according to an embodiment of this application;

FIG. 18 is a schematic flowchart of another method for determining a sidelink resource according to an embodiment of this application;

FIG. 19 is a schematic diagram of another time-frequency resource according to an embodiment of this application;

FIG. 20 is a schematic diagram of a structure of an apparatus for determining a sidelink transmission resource according to an embodiment of this application;

FIG. 21 is a schematic diagram of a structure of another apparatus for determining a sidelink transmission resource according to an embodiment of this application;

FIG. 22 is a schematic diagram of a structure of another apparatus for determining a sidelink transmission resource according to an embodiment of this application;

FIG. 23 is a schematic diagram of a structure of another apparatus for determining a sidelink transmission resource according to an embodiment of this application; and FIG. 24 is a schematic diagram of a structure of another apparatus for determining a sidelink transmission resource according to an embodiment of this application.

DETAILED DESCRIPTION OF ILLUSTRATIVE EMBODIMENTS

To facilitate understanding of this application, related technologies in this application are described herein.

1. Device-to-Device (D2D) Technology

The D2D technology refers to a technology that enables a plurality of user equipments (UE) supporting a D2D function to perform direct discovery and direct communication regardless of whether a network technology facility is available or not. A transmission link in D2D may be referred to as a sidelink (SL).

Figure 1A:
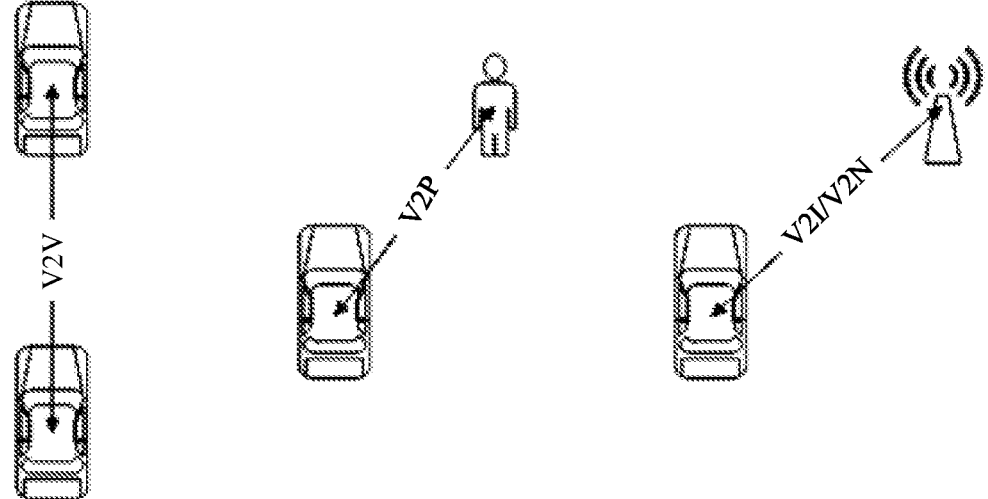
FIG. 1A is a schematic diagram of an application scenario of a D2D technology according to an embodiment of this application.

In view of characteristics and advantages of the D2D technology, an Internet-of-vehicles application scenario based on the D2D technology is provided. In a network of a long-term evolution (LTE) technology provided by the 3rd Generation Partnership Project (3GPP), an Internet of vehicles technology, that is, vehicle-to-everything (V2X), is proposed. V2X communication refers to communication between a vehicle and any object outside, including vehicle to vehicle (V2V) communication, vehicle to pedestrian (V2P) communication, vehicle to infrastructure (V2I) communication, and vehicle to network (V2N for short) communication, as shown in FIG. 1A.

The V2X communication may support a communication scenario with network coverage and a communication scenario without network coverage, and a resource allocation manner of the V2X communication may be classified into a base-station resource allocation mode, for example, an evolved Node B (eNB) scheduling mode, and a user self-selection mode. The base-station resource allocation mode may be referred to as a mode-1 mode for short, and the user self-selection mode may be referred to as a mode-2 mode for short.

The base-station resource allocation mode (mode-1) is mainly applied to V2X communication with network coverage. In the base-station resource allocation mode, a base station performs resource allocation in a centralized manner based on BSR reporting statuses of UEs. Resource allocation may be in a dynamic mode or a preconfigured mode. A resource allocated by the base station may include an initial resource and/or a retransmission resource.

In the user resource self-selection mode (mode-2), a transmission resource of a transmit end UE does not depend on a base station, and the transmit end UE itself selects a transmission resource for communication. This mode is not restricted by network coverage. That is, the transmit end UE can also perform communication in this mode without network coverage. A resource selected by a user includes an initial resource and/or a retransmission resource.

2. Implementation of User Resource Self-Selection Mode

In a user resource self-selection mode, a terminal device (referred to as a "first terminal" below) may select a transmission resource in a resource selection window based on a resource monitoring result of the terminal device, for sending information to another terminal device based on a sidelink. An implementation process of the user self-selection resource mode may be classified into two types, which are separately described below.

The first implementation process of the user resource self-selection mode is as follows:

It is assumed that $(t_0^{SL}, t_1^{SL}, t_2^{SL}, \ldots)$ is defined as a time unit set of time domain resources belonging to a sidelink resource pool. In embodiments of this application, the sidelink resource pool may be understood as a set of wireless transmission resources that are in wireless transmission resources and that can be used for sidelink transmission. The time unit herein may be a subframe, a radio frame, a slot, a mini-slot, a symbol, a transmission time interval (TTI), or the like. For example, in NR-V2X, a time unit of a time domain resource may be a slot. The following uses NR-V2X as an example to describe the implementation process of the first user resource self-selection mode.

If the first terminal receives, in a slot n, a request for triggering a resource determining procedure by a higher layer, the first terminal needs to determine a group of resources and report the group of resources to the higher layer. The higher layer selects, from the group of resources, a resource for physical layer link shared channel (PSSCH) and/or physical layer link control channel (PSCCH) transmission. A control plane protocol stack structure of the first terminal may be separately a physical layer (PHY), a media access control layer (MAC), a radio link control layer (RLC), a packet data convergence layer protocol layer (PDCP), a service data adaptation layer (SDAP), and a radio resource control layer (RRC) from a bottom layer to a higher layer. All layers other than the physical layer may be referred to as higher layers.

A resource selection window is defined as slots corresponding to $[n+T_1, n+T_2]$ after a time unit n for triggering resource determining.

In embodiments of this application, the resource selection window may be understood as a range of available resources when a device (for example, the first terminal) transmits to-be-transmitted information based on a sidelink. For example, if a resource selection window (selection window) in which the first terminal sends to-be-transmitted information is defined as slots corresponding to $[n+T_1, n+T_2]$ after a time unit n for triggering resource determining, it indicates that a slot used by the first terminal for transmitting the to-be-transmitted information cannot be earlier than a slot $n+T_1$ and cannot be later than a slot $n+T_2$.

Figure 1B:
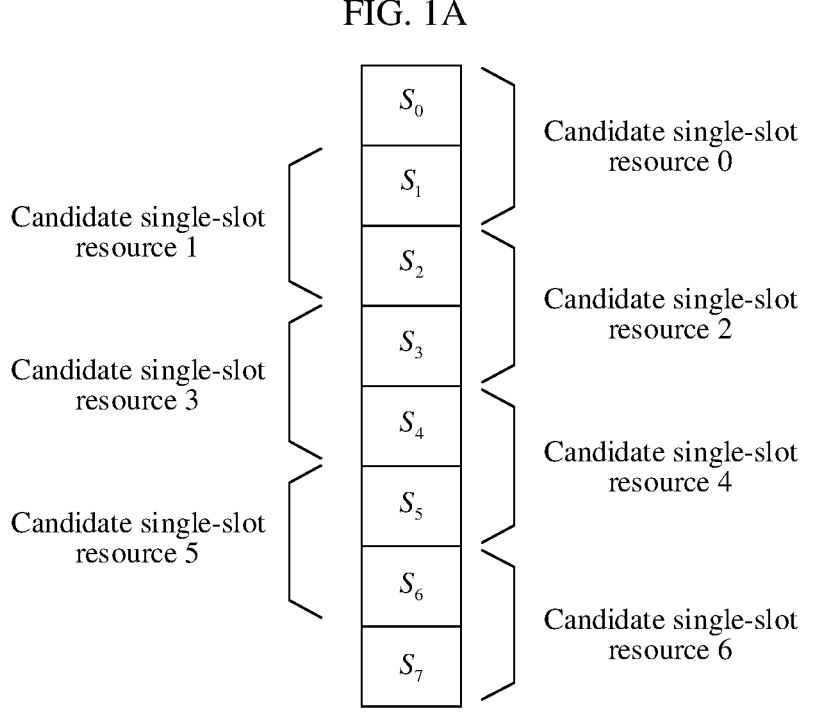

A quantity of subchannels included in the sidelink resource pool in frequency domain is defined as $N_{subCH}$, and a corresponding subchannel set is $S = \{S_0, S_1, \ldots, S_{N_{subCH}-1}\}$. A subchannel is a basic scheduling unit of the sidelink resource pool in frequency domain. One subchannel may include several resource blocks (resource block, RB). A quantity of RBs included in one subchannel is related to a protocol that is used. Each candidate single-slot resource (candidate single-slot resource) $R_{x,y}$ for transmitting data is located in a slot $t_y^{SL}$ that is in the resource selection window $[n+T_1, n+T_2]$ in time domain and that belongs to the sidelink resource pool, and is located on a subchannel x+j in frequency domain, where $j = 0, 1, \ldots, L_{subCH}-1$. It may be understood that a candidate single-slot resource $R_{x,y}$ is represented as a group of consecutive subchannel sets with a length equal to $L_{subCH}$ in frequency domain, and $L_{subCH}$ is a quantity of subchannels occupied by a PSSCH and/or a PSCCH corresponding to to-be-transmitted information. Therefore, a total quantity of candidate single-slot resources in each slot is $N_{subCH}-L_{subCH}+1$. For example, as shown in FIG. 1B, a quantity $N_{subCH}$ of subchannels included in a frequency domain resource pool is 8, and a corresponding subchannel set is $S = \{S_0, S_1, \ldots, S_7\}$. In addition, it is assumed that a quantity $L_{subCH}$ of subchannels occupied by a PSSCH and/or a PSCCH corresponding to to-be-transmitted information is 2. In this case, as shown in FIG. 1B, a total quantity of candidate single-slot resources in each slot is $N_{subCH}-L_{subCH}+1 = 7$, that is, there may be seven candidate single-slot resources in each slot.

For resources in a resource selection window, it can be determined, based on SCI sent by another terminal device before the resources, whether a resource in the resource selection window is reserved in other SCI. A process of obtaining SCI of another terminal device may be referred to as sensing or monitoring, and is uniformly referred to as monitoring in this application. When the first terminal monitors SCI of another terminal device, a range monitored by the first terminal is referred to as a resource sensing window.

The resource sensing window may be defined as $[n-T_0, n-T_{proc,0}^{SL})$ where $T_0$ may be configured through a higher-layer parameter sl_SensingWindow, and $T_{proc,0}^{SL}$ is related to a subcarrier spacing. For example, the resource selection window and the resource sensing window are shown in FIG. 2.

Then, the first terminal monitors, in the resource sensing window, sidelink control information (sidelink control information, SCI) sent by another terminal device in the sidelink resource pool, to determine a resource that is in the resource selection window $[n+T_1,n+T_2]$ and that has been reserved by the another terminal device. Then, the first terminal selects, from the resource selection window based on a determined result, a resource for transmission. The details are as follows:

S101. A first terminal monitors, in a resource sensing window, SCI sent by another terminal device in a sidelink resource pool.

S102. The first terminal measures, if it is determined, based on the monitored SCI, that the another terminal device (referred to as a "second terminal") reserves a resource A, and the resource A overlaps with a resource $R_{x,y+j\times P'_{rsvp\_TX}}$, a PSSCH reference signal received power (PSSCH-RSRP) and/or a PSCCH reference signal received power (PSCCH-RSRP) of a demodulation reference signal (DMRS) on a PSSCH and/or a PSCCH determined based on the SCI sent by the second terminal in a slot $t_m^{SL}$.

$R_{x,y+j\times P'_{rsvp\_TX}}$ represents a resource that starts from a slot $R_{x,y}$ of a resource selection window $[n+T_1, n+T_2]$ and that is occupied by to-be-transmitted information of the first terminal when a periodic reservation is performed for the to-be-transmitted information If a measured result is higher than a preset RSRP threshold $Th_{RSRP}$, a candidate single-slot resource $R_{x,y}$ is excluded from the resource selection window. A value of the threshold $Th_{RSRP}$ is a function about a priority value corresponding to data indicated in the received SCI from the second terminal and a priority value corresponding to to-be-sent data of the first terminal. For example, when the priority value indicated in the received SCI is lower, and/or the priority value corresponding to the to-be-sent data of the first terminal is lower, the threshold $Th_{RSRP}$ is smaller. In this way, more interference resources are excluded, so as to reduce possible interference to the to-be-sent data of the first terminal.

S103. Increase, if a quantity of remaining candidate single-slot resources in the resource selection window is less than X % of a quantity of all candidate single-slot resources, the threshold $Th_{RSRP}$ by 3 dB, and repeat S102. In this way, the quantity of remaining candidate single-slot resources may be avoided from being too small.

S104: The first terminal reports a set of remaining candidate single-slot resources to a higher layer of the first terminal, and the higher layer of the first terminal selects, from the set of remaining candidate single-slot resources, a resource for PSSCH and/or PSCCH transmission.

It can be learned that in the foregoing process, the first terminal needs to continuously monitor all resources that are in the resource sensing window except a resource used by the first terminal for sending data and that belong to the sidelink resource pool, and perform resource exclusion based on a result of the monitoring. Therefore, a large calculation overhead may be caused, which is not conducive to energy saving of the device.

An implementation process of the second user resource self-selection mode may be referred to as a partial sensing-based resource selection mode. It should be understood that the "partial sensing-based resource selection mode" is merely a possible name for ease of describing the resource selection mode provided below. In specific implementations or other documents, such a resource selection mode may also be referred to as another name. A name of the resource selection mode is not limited in this application.

A principle of the partial sensing-based resource selection mode is as follows: Some time domain resources (referred to as a first time domain resource set) are first determined in a resource selection window. For example, the first time domain resource set may be some slots or some subframes in the resource selection window. Then, a time domain resource on which a candidate resource in the first time domain resource set can be reserved is monitored, to determine whether another terminal device reserves each candidate resource in the first time domain resource set. Then, a candidate resource for sending the to-be-transmitted information is determined based on a result of the monitoring.

The candidate resource represents a time-frequency resource that can be used for transmitting the to-be-transmitted information. It may be understood that for a definition of the candidate resource, refer to the foregoing description of the candidate single-slot resource. In other words, a "candidate single-slot resource" may be understood as a candidate resource that uses a slot as a time unit. For example, in the first time domain resource set, one time domain resource (for example, one slot) may include one or more candidate resources (that is, candidate single-slot resources). A frame structure in LTE is in a unit of a subframe. Therefore, a candidate resource in LTE is a candidate single-subframe resource. In this specification, the candidate single-slot resource or the candidate single-subframe resource may be referred to as a candidate resource for short.

For example, the following uses LTE-V2X as an example to describe the partial sensing-based resource selection mode. It should be noted that a basic time unit in time domain in LTE-V2X is a subframe. Therefore, a subframe is also used as a time unit in time domain in the following description. Specifically, implementation of the partial sensing-based resource selection mode in LTE-V2X mainly includes the following S201 to S207.

S201: The first terminal first determines at least Y subframes in a resource selection window $[n+T_1,n+T_2]$. Y may be determined through a higher-layer parameter minNumCandidateSF, and a value of minNumCandidateSF ranges from 1 to 13. Then, Y' subframes that belong to a sidelink resource pool are determined from the Y subframes. As shown in FIG. 3, a subframe $t_1$ and a subframe $t_2$ are two determined subframes that belong to the sidelink resource pool. For a definition of a candidate resource $R_{x,y}$ in each subframe, refer to the foregoing description of the "candidate single-slot resource", where a slot is replaced with a subframe. For example, the sidelink resource pool includes $N_{subCH}$ subchannels, and $L_{subCH}$ subchannels need to be occupied by the first terminal for sending to-be-transmitted information. In this case, there may be $N_{subCH}-L_{subCH}+1$ candidate resources in one subframe. For ease of description, a set of all candidate resources in the Y' subframes is defined as $S_A$.

S202: The first terminal needs, if a subframe $t_y^{SL}$ belongs to the Y' subframes, to monitor a subframe $t_{y-k\times P_{step}}^{SL}$. $k\times P_{step}$ represents a logical period (that is, a period when only a time unit in the sidelink resource pool is included) corresponding to a resource reservation period configured for the sidelink resource pool. k is determined through a higher-layer parameter gapCandidateSensing, the higher-layer parameter is specifically a sequence whose length is 10, a value of each element in the sequence is 0 or 1, and k is an index value corresponding to an element whose value is 1 in the sequence. A definition of $P_{step}$ is related to a frame structure in LTE, and is specifically defined as follows:

TABLE 1

| Frame | | Quantity of subframes | | | | | | | | | |
|---|---|---|---|---|---|---|---|---|---|---|---|
| structure | $P_{step}$ | 0 | 1 | 2 | 3 | 4 | 5 | 6 | 7 | 8 | 9 |
| TDD Configuration 0 | 60 | U | S | U | U | U | D | S | U | U | U |
| TDD Configuration 1 | 40 | U | S | U | U | D | D | S | U | U | D |
| TDD Configuration 2 | 20 | U | S | U | D | D | D | S | U | D | D |
| TDD Configuration 3 | 30 | D | S | U | U | U | D | D | D | D | D |
| TDD Configuration 4 | 20 | D | S | U | U | D | D | D | D | D | D |
| TDD Configuration 5 | 10 | D | S | U | D | D | D | D | D | D | D |
| TDD Configuration 6 | 50 | U | S | U | U | U | D | S | U | U | D |
| FDD | 100 | D/U | D/U | D/U | D/U | D/U | D/U | D/U | D/U | D/U | D/U |

In Table 1, D represents a downlink subframe, U represents an uplink subframe, and S represents a special subframe. It can be learned from Table 1 that a value of $P_{step}$ is a quantity of subframes (uplink subframes in LTE) that can be used for sidelink transmission in a frame structure configuration within 100 ms. For example, when a frame structure is a TDD configuration 2, and a quantity of uplink subframes in 10 ms is 2, a value of $P_{step}$ is 2*10=20.

For example, for a subframe $t_1$ and a subframe $t_2$ in FIG. 3, assuming that values of k determined through the higher-layer parameter gapCandidateSensing are k' and k", in FIG. 3, four subframes, $t_1$", $t_2$", $t_1$', and $t_2$", need to be separately monitored.

It should be understood that, in an actual implementation process, in an embodiment, the first terminal may first determine a candidate resource in a resource selection window (for example, determine Y subframes and determine Y' subframes that belong to a sidelink resource pool, as described in S201), then determine, based on the determined candidate resource, a monitoring resource corresponding to the candidate resource (for example, determine a corresponding subframe $t_{y-k \times P_{step}}^{SL}$ based on a subframe $t_y^{SL}$ in the Y' subframes that belong to the sidelink resource pool), and then, perform a process of monitoring a monitoring resource (for example, monitor the subframe $t_{y-k \times P_{step}}^{SL}$).

The monitoring resource in embodiments of this application refers to a resource on which a candidate resource can be reserved.

In another embodiment, the first terminal may first determine a monitoring resource (denoted as a subframe $t_z^{SL}$) in the resource sensing window, and then determine, in the resource selection window, a candidate resource (denoted as a subframe $t_{z-k \times P_{step}}^{SL}$) corresponding to the monitoring resource, so as to complete a process of determining, in the resource selection window, Y' subframes that belong to the sidelink resource pool. It may be understood that in this case, the subframe $t_{z+k \times P_{step}}^{SL}$ is equivalent to the subframe $t_y^{SL}$ in the Y' subframes that belong to the sidelink resource pool in S201, and the subframe $t_z^{SL}$ is equivalent to the subframe $t_{y-k \times P_{step}}^{SL}$ in S202.

In other words, in an actual implementation process, the candidate resource may be first determined in the resource selection window, and then the monitoring resource corresponding to the candidate resource is determined based on the determined candidate resource. Alternatively, the monitoring resource may be first determined, and then the candidate resource corresponding to the monitoring resource is determined in the resource selection window. The monitoring resource may be a resource that has been monitored (that is, a result of the monitoring has been obtained), or may be a to-be-monitored resource. In an implementation process of the method provided in embodiments of this application, either of the foregoing two manners may be used based on an application scenario and a requirement. This is not limited in this application.

S203: Define a set including all candidate resources in the Y' subframes as a candidate resource set $S_A$, and define $S_B$, where $S_B$ is initially an empty set.

S204: Exclude the candidate resource $R_{x,y}$ from the set $S_A$ if the candidate resource $R_{x,y}$ meets both a condition 1 and a condition 2 as follows.

Condition 1: A reserved time-frequency resource determined based on SCI received in a subframe $t_m^{SL}$ ($t_m^{SL}$ is one of the monitored subframes) and SCI expected to be received in a subframe $t_{m+q \times P_{step} \times P_{rsvp\_RX}}^{SL}$ overlaps with a resource $R_{x,y+j \times P'_{rsvp\_TX}}$.

$t_{m+q \times P_{step} \times P_{rsvp\_RX}}^{SL}$ indicates that if another terminal device has performed transmission of a PSSCH and/or a PSCCH in the subframe $t_m^{SL}$, the another terminal device may perform transmission of the PSSCH and/or the PSCCH again in the subframe $t_{m+q \times P_{step} \times P_{rsvp\_RX}}^{SL}$, that is, the another terminal device reserves, in the subframe $t_m^{SL}$, a transmission resource in the subframe $t_{m+q \times P_{step} \times P_{rsvp\_RX}}^{SL}$. $P_{rsvp\_RX}$ is a period of a PSSCH and/or a PSCCH that is obtained by the first terminal by decoding SCI received in the subframe $t_m^{SL}$ ($t_m^{SL}$ is one of the monitored subframes) and that correspond to the SCI. Specifically, $P_{rsvp\_RX}$ is indicated by a Resource reservation field in SCI format-1 of LTE, and is defined in Table 2. A specific value of $P_{rsvp\_RX}$ is a resource reservation period (in a unit of millisecond, that is, a physical period) of the another terminal device divided by 100. In addition, it can be learned that a value of $P_{step}$ is a quantity of subframes (uplink subframes in LTE) that can be used for sidelink transmission in a frame structure configuration within 100 ms. Therefore, $P_{step} \times P_{rsvp\_RX}$ represents a logical period corresponding to a resource reservation period of the another terminal device. Additionally, q=1, 2, . . . , Q. If $P_{rsvp\_RX} \leq 1$, and y'−m$\leq P_{step} \times P_{rsvp\_RX} + P_{step}$, Q=1/$P_{rsvp\_RX}$, where y' is a time unit of the last subframe in the at least Y' subframes, m is a time unit of $t_m^{SL}$, and y'−m is a logical time unit of an interval between the last subframe in the Y' subframes and $t_m^{SL}$ (that is, includes only a time unit in the sidelink resource pool). Otherwise, Q=1.

TABLE 2

| Resource reservation field | Value of $P_{rsvp\_RX}$ |
| --- | --- |
| '0001', '0010', . . . , '1010' | 1, 2, . . . , 10 |
| '1011' | 0.5 |
| '1100' | 0.2 |
| '0000' | 0 |
| '1101', '1110', '1111' | Reserved |

In addition, $R_{x,y+j \times P'_{rsvp\_TX}}$ represents a resource that starts from a candidate resource $R_{x,y}$, and that is occupied for sending to-be-transmitted information of the first terminal when the to-be-transmitted information is periodically sent. $j=0, 1, \ldots, C_1-1$, where $C_1$ is a quantity of sending periods of the to-be-transmitted information. $P'_{rsvp\_TX}=P_{step} \times P_{rsvp\_TX}/100$, where $P_{rsvp\_TX}$ represents a resource reservation period (which is in a unit of millisecond, that is, a physical period) for sending the to-be-transmitted information by the first terminal, that is, $P'_{rsvp\_TX}$ represents a logical period for sending the to-be-transmitted information by the first terminal.

In addition, in this case, the physical period and the logical period in embodiments of this application are explained and described. When a frame structure is a TDD configuration 2, as shown in FIG. 4, it is assumed that a physical period $P_{rsvp\_TX}$ of to-be-transmitted information is 20 ms, the first transmission of the to-be-transmitted information is located in the $1^{st}$ uplink subframe $R_1$ of a first system frame, and the second transmission is located in the $1^{st}$ uplink subframe $R_2$ of a third system frame. Further, based on a definition of a sidelink resource pool in LTE, a downlink subframe and a special subframe in the frame structure in FIG. 4 are excluded, and a subframe set for sidelink transmission is shown in FIG. 5. In FIG. 5, a spacing between a subframe $R_1$ and a subframe $R_2$ (that is, a logical period $P'_{rsvp\_TX}$ of to-be-transmitted information) in a sidelink resource pool is $P'_{rsvp\_TX}=P_{step} \times P_{rsvp\_TX}/100=20 \times 20/100=4$.

Condition 2: A measurement result of a PSSCH-RSRP determined through SCI received in a subframe $t_m^{SL}$ is greater than a threshold $gh_{prioTX,prioRX}$.

A value of the threshold $Th_{prioTX,prioRX}$ is a function about prioTX and prioRX prioTX is a priority corresponding to to-be-sent data of the first terminal, and is a priority corresponding to data indicated in SCI received in a subframe $t_m^{SL}$.

S205: Increase, if a quantity of remaining candidate resources in the candidate resource set $S_A$ is less than 20% of $M_{total}$, a preset RSRP threshold to try a system $rh_{prioTX,prioRX}$ by 3 dB, and repeat S203.

S206: The first terminal performs received signal strength indication (received signal strength indication, RSSI) measurement on candidate resources in the candidate resource set $S_A$, and adds 20%×$M_{total}$ candidate resources with minimum RSSI measurement results to the set $S_B$.

S207: The first terminal reports the set $S_B$ to the higher layer, so that the higher layer determines, from the set $S_B$, a resource for sending the to-be-transmitted information.

The following describes technical solutions provided in embodiments of this application with reference to the accompanying drawings in embodiments of this application.

Embodiments of this application may be applied to a communication system shown in FIG. 6. The communication system includes a terminal device 11 and a terminal device 12. The terminal device 11 and the terminal device 12 may establish a sidelink by using a D2D technology, and transmit data over the sidelink link. The terminal device 11 and the terminal device 12 are devices having a wireless communication function, and may be deployed on land, including indoor or outdoor, handheld, or vehicle-mounted deployment. Alternatively, the terminal device 11 or the terminal device 12 may be deployed on water (for example, on a ship), or may be deployed in the air (for example, on an airplane, a balloon, or a satellite). The terminal, also referred to as user equipment (UE), a mobile station (MS), a mobile terminal (MT), a terminal device, and the like, is a device that provides voice and/or data connectivity for a user. For example, the terminal includes a handheld device or a vehicle-mounted device having a wireless connection function. Currently, the terminal may be a mobile phone, a tablet computer, a notebook computer, a palmtop computer, a mobile Internet device (MID), a wearable device (for example, a smart watch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot air balloon, an unmanned aerial vehicle, or an aircraft), or the like. In a possible application scenario of this application, the terminal device is a terminal device that often operates on land, for example, a vehicle-mounted device. In this application, for ease of description, a chip deployed in the foregoing device, for example, a system-on-a-chip (SOC), a baseband chip, or another chip having a communication function, may also be referred to as a terminal.

The terminal device 11 or the terminal device 12 may be a vehicle with a corresponding communication function, a vehicle-mounted communication apparatus, or another embedded communication apparatus, or may be a handheld communication device of a user, including a mobile phone, a tablet computer, or the like.

In addition, when solutions described in embodiments of this application are applied to a V2X scenario, the solutions may be applied to the following fields: unmanned driving, automated driving (ADS), driver assistance (ADAS), intelligent driving, connected driving, intelligent network driving, and car sharing.

For example, in embodiments of this application, the terminal device 11 and the terminal device 12 may alternatively be wearable devices. The wearable device may also be referred to as a wearable intelligent device, and is a general term of wearable devices that are intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, or smart jewelry for monitoring physical signs.

FIG. 7 is a schematic diagram of a hardware structure of a communication device according to an embodiment of this application. For hardware structures of the terminal device 11 and the terminal device 12 in embodiments of this application, refer to the structure shown in FIG. 7.

The communication device includes a processor 21, a communication line 24, and at least one transceiver (FIG. 7 is described by using merely an example in which the communication device includes a transceiver 23).

The processor 21 may be a general-purpose central processing unit (CPU), a microprocessor, an application-specific integrated circuit (ASIC), or one or more integrated circuits configured to control execution of a program in the solutions of this application.

The communication line 24 may include a path for transmitting information between the foregoing components.

The transceiver 23 is any apparatus such as a transceiver, and is configured to communicate with another device or a communication network, for example, the Ethernet, a radio access network (RAN), or a wireless local area network (WLAN).

Optionally, the communication device may further include a memory 22.

The memory 22 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 22 is not limited thereto. The memory may exist independently, and is connected to the processor through the communication line 44. The memory may alternatively be integrated with the processor.

The memory 22 is configured to store computer-executable instructions for performing the solutions in this application, and the computer-executable instructions are executed under control of the processor 21. The processor 21 is configured to execute the computer-executable instructions stored in the memory 22, to implement a policy control method provided in the following embodiments of this application.

Optionally, the computer-executable instructions in embodiments of this application may also be referred to as application program code. This is not specifically limited in embodiments of this application.

During specific implementation, in an embodiment, the processor 21 may include one or more CPUs, for example, a CPU 0 and a CPU 1 in FIG. 7.

During specific implementation, in an embodiment, a communication device may include a plurality of processors, for example, a processor 21 and a processor 25 in FIG. 7. Each of the processors may be a single-core (single-CPU) processor, or may be a multi-core (multi-CPU) processor. The processor herein may be one or more devices, circuits, and/or processing cores configured to process data (for example, computer program instructions).

The following describes, with reference to the accompanying drawings, a method for determining a sidelink resource according to an embodiment of this application.

It should be noted that embodiments of this application may be mutually learned from or referenced. For example, mutual referencing may be made between same or similar steps, method embodiments, communication system embodiments, and apparatus embodiments. This is not limited in this application.

Currently, in a user resource self-selection mode, the terminal device 11 may select a transmission resource in a resource selection window based on a resource monitoring result of the terminal device 11. A partial sensing resource selection mode is gradually used because it can reduce device power. Currently, an implementation process of the partial sensing resource selection mode mainly includes the following steps.

Step 1: The terminal device 11 first determines, in a resource selection window $[n+T_1,n+T_2]$, Y' time domain resources that belong to a sidelink resource pool.

For a specific implementation process of step 1 in LTE-V2X, refer to S201.

Step 2: The terminal device 11 monitors, if a time domain resource $t_y^{SL}$ belongs to the Y' time domain resources that belong to the sidelink resource pool, a monitoring resource corresponding to the time domain resource $t_y^{SL}$, to determine whether another terminal device reserves a candidate resource in the time domain resource $t_y^{SL}$.

For a specific implementation process of step 2 in LTE-V2X, refer to S202.

Step 3: Perform resource exclusion and/or resource reporting based on a result of the monitoring in step 2.

Resource exclusion may be understood as excluding, from the Y' time domain resources, a corresponding candidate resource reserved by the another terminal device, to obtain a candidate resource that can be used by the terminal device 11 for sending information. If no resource reserved by another terminal device is found in the Y' time domain resources, the resource may not be excluded. Resource reporting may be understood as reporting, to a higher layer, remaining candidate resources that can be used by the terminal device 11 for sending information after the resource exclusion, so that the higher layer determines, from the resources, a candidate resource for sending information.

For a specific implementation process of step 3 in LTE-V2X, refer to S203 to S207.

It can be learned that, in the partial sensing (partial sensing)-based resource selection mode, some monitoring resources are located after the candidate resource. For example, as shown in FIG. 8, a monitoring resource corresponding to a time domain resource $t_1$ is $t_1'$, and a monitoring resource corresponding to a time domain resource $t_2$ is $t_2'$. In this case, if all monitoring resources, $t_1'$ and $t_2'$, are still monitored, some candidate resources become expired resources. Specifically, if $t_2'$ is monitored, has expired. Consequently, available candidate resources are reduced.

To resolve the foregoing problem, in LTE-V2X, a length of the resource selection window is less than or equal to a minimum period in resource reservation periods configured for the sidelink resource pool, so as to avoid a case in which a monitoring resource is after the candidate resource. Specifically, on the one hand, in LTE-V2X, a location $t_{y-k*P_{step}}^{SL}$ of a monitoring subframe is determined based on a location of a candidate subframe $t_y^{SL}$ and a spacing between the monitoring subframe and the candidate subframe $k*P_{step}$. It can be learned from the foregoing description that a value of k is a sequence whose length is 10, and $P_{step}$ indicates a quantity of subframes (uplink subframes in LTE) that can be used for sidelink transmission in a frame structure configuration within 100 ms. Therefore, a resource reservation period (physical period) corresponding to $k*P_{step}$ may include 100 ms, 200 ms, 300 ms, 400 ms, 500 ms, 600 ms, 700 ms, 800 ms, 900 ms, and 1000 ms. On the other hand, in LTE-V2X, a range of the resource selection window $[n+T_1, n+T_2]$ is determined by $T_1 \leq 4$ and $T_2(\text{prio}_{TX}) \leq T_2 \leq 100$. In other words, a minimum value of the resource selection window is 100 ms, and is less than or equal to a minimum value 100 ms in a physical period corresponding to $k*P_{step}$. Therefore, in LTE-V2X, a case in which a monitoring resource appears after a candidate resource can be avoided.

However, when a length of the resource selection window is greater than a minimum period in the resource reservation periods configured for the sidelink resource pool, a monitoring resource appears after the candidate resource. For example, in NR-V2X, both a periodic service and an aperiodic service are supported. In addition, for a period configuration, in addition to period configurations of 100 ms, 200 ms, . . . , and 1000 ms, period configurations of 1 ms, 2 ms, . . . , 99 ms, and 100 ms are further supported. In addition, in NR-V2X, a range of the resource selection window $[n+T_1, n+T_2]$ is more flexible. A value range of $T_1$ in the resource selection window $[n+T_1, n+T_2]$ is $0 \leq T_1 \leq T_{proc,1}^{SL}$, where $T_{proc,1}^{SL}$ is related to a subcarrier spacing. A value of $T_2$ is related to $T_{2min}$ and a remaining packet delay budget (packet delay budget, PDB). $T_{2min}$ is configured by the higher layer, and is related to a priority of a terminal device that sends data, and the remaining PDB is less than a resource reservation period of current to-be-sent data. If $T_{2min} <$ the remaining PDB, a value range of $T_2$ is $T_{2min} \leq T_2 \leq$ the remaining PDB. Otherwise, $T_2$ is equal to the remaining PDB. Therefore, an upper bound of the resource selection window is the remaining PDB. If a resource reservation period of current to-be-sent data is greater than a minimum period in the resource reservation periods configured for the sidelink resource pool, a monitoring resource appears after the candidate resource.

In addition, a frame structure in NR-V2X is more flexible and changeable. A length of each system frame (frame) is the same as that in LTE, and is still 10 ms. A range of a system frame number SFN is 0 to 1023. A length of each subframe (subframe) is still 1 ms. A subframe number in a system frame is 0 to 9. A relationship between a slot (slot) and a subcarrier spacing (subcarrier spacing SCS) in each subframe is shown in Table 3:

TABLE 3

| SCS (kHz) | Quantity of symbols per slot | Quantity of slots per subframe | Quantity of slots per system frame |
|---|---|---|---|
| | Slot layout (normal cyclic prefix (normal CP)) | | |
| 15 | 14 | 1 | 10 |
| 30 | 14 | 2 | 20 |
| 60 | 14 | 4 | 40 |
| 120 | 14 | 8 | 80 |
| 240 | 14 | 16 | 160 |
| 480 | 14 | 32 | 320 |
| | Slot layout (extended cyclic prefix (extended CP)) | | |
| 60 | 12 | 4 | 40 |

Therefore, in an NR-V2X configuration, a sensing slot may be located after a candidate resource slot. In this way, a total quantity of available candidate resources is reduced, resulting in resource collision, increased system interference, and reduced system throughput.

Based on the foregoing technical problems, embodiments of this application provide a method for determining a sidelink transmission resource. The following describes the method by using an example in which the method is applied to the terminal device 11 in the communication system shown in FIG. 6.

The method provided in embodiments of this application may be applied to a scenario in which a minimum period length of resource reservation periods configured for a sidelink resource pool in a partial sensing mode may be less than a length of a resource selection window in sidelink transmission. For example, in the partial sensing mode of NR-V2X, a minimum period in the resource reservation periods configured for a sidelink resource pool may be less than 100 ms, and a width of the resource selection window may be greater than 100 ms. In addition, the method provided in embodiments of this application may also be applied to a scenario in which a maximum value in values of $T_2$ in a resource selection window $[n+T_1, n+T_2]$ is related to a remaining PDB of to-be-transmitted information in sidelink transmission. For example, in NR-V2X, a value of $T_2$ is related to $T_{2min}$ and a remaining PDB, where $T_{2min}$ is configured by the higher layer, and is related to a priority of a terminal device that sends data, and the remaining PDB is less than a resource reservation period of current to-be-sent data. If $T_{2min} <$ the remaining PDB, a value range of $T_2$ is $T_{2min} \leq T_2 \leq$ the remaining PDB. Otherwise, $T_2$ is equal to the remaining PDB.

The following describes, from three aspects, a method for determining a sidelink transmission resource according to an embodiment of this application. It should be noted that the following describes the method according to an embodiment of this application in three aspects, to facilitate understanding and reading of the solution. In a specific implementation process, the technical means described in the methods in the three aspects may be applied in combination with each other. For example, a technical means in one aspect may be applied to a method described in another aspect, so as to achieve a technical effect to be achieved by the technical means. In addition, description content of technical features with a same meaning or similar meanings in the three aspects may also be mutually referenced. This is not limited in this application.

First Aspect

As shown in FIG. 9, the method includes the following steps.

S301: The terminal device 11 determines a first time domain resource set in a resource selection window.

The resource selection window may be a set of time domain resources within a time interval after resource determining is triggered. A function of the resource selection window is to delimit, after resource determining is triggered, a time window for sending to-be-transmitted information. For example, a range of the resource selection window in NR-V2X is $[n+T_1, n+T_2]$. A value range of $T_1$ is $0 \leq T_1 \leq T_{proc,1}^{SL}$, where $T_{proc,1}^{SL}$ is related to a subcarrier spacing. A value of $T_2$ is related to $T_{2min}$ and a remaining packet delay budget (packet delay budget, PDB), where $T_{2min}$ is configured by a higher layer, and is related to a priority of a terminal device that sends data. If $T_{2min} <$ the remaining PDB, a value range of $T_2$ is $T_{2min} \leq T_2 \leq$ the remaining PDB. Otherwise, $T_2$ is equal to the remaining PDB.

The first time domain resource set is for sidelink transmission. In other words, the first time domain resource set is a set of time domain resources that belong to the sidelink resource pool and that are in the resource selection window. A time unit of each time domain resource in the first time domain resource set may be a slot, a subframe, a system frame, or the like. For example, when the method is applied to NR-V2X, a time unit of each time domain resource in the first time domain resource set is a slot. For ease of description, the following mainly describes the method by using a slot as a time unit. It may be understood that the method may also be implemented by using a subframe or a system frame as a time unit.

For example, it is assumed that a range of the resource selection window is $[n+T_1,n+T_2]$, the first time domain resource set may be some or all of time domain resources for sidelink transmission in $[n+T_1,n+T_2]$.

For example, the terminal device 11 may first determine Y resource slots in the resource selection window $[n+T_1,n+T_2]$. Then, Y' candidate resource slots (namely, the first time domain resource set) that belong to the sidelink resource pool are determined from the Y resource slots. In another example, the terminal device 11 may further directly select, from the resource selection window $[n+T_1, n+T_2]$, the Y' candidate resource slots (namely, the first time domain resource set) that belong to the sidelink resource pool.

In addition, a time domain resource in the first time domain resource set may be determined in either of the following two manners:

In a first manner, one or more monitoring resources are first determined in a resource sensing window; then one or more candidate resources corresponding to the one or more monitoring resources are determined in the resource selection window; and then some or all of the one or more candidate resources are used as time domain resources in the first time domain resource set. That is, in this case, the time domain resource in the first time domain resource set is determined in a manner of first determining the monitoring resource, and then determining, based on the monitoring resource, the time domain resource in the resource selection window corresponding to the monitoring resource. The one or more monitoring resources may be resources that have been monitored (that is, a result of the monitoring has been obtained), or may be to-be-monitored resources.

In a second manner, a candidate time domain resource in the first time domain resource set is first determined, and then a monitoring resource corresponding to the candidate resource is determined based on the candidate resource. For example, the Y' candidate resource slots that belong to the sidelink resource pool may be determined, from the resource selection window in a random selection manner, as the first time domain resource set. Then, a location of a to-be-monitored time domain resource is determined based on the determined first time domain resource set. In other words, in this case, the first time domain resource set is first determined, and then a to-be-monitored monitoring resource is determined based on locations of time domain resources in the first time domain resource set.

In an implementation process of the method provided in embodiments of this application, either of the foregoing two manners may be used based on an application scenario and a requirement. This is not limited in this application. Similarly, in the following methods provided in the second aspect and the third aspect, the first time domain resource set is determined in either of the foregoing two manners based on an application scenario and a requirement. Details are not described again.

In addition, for a frequency domain range corresponding to the resource selection window, refer to foregoing descriptions of the sidelink resource pool and the subchannels included in the sidelink resource pool in the related technology. For example, in the first time domain resource set, one time domain resource (for example, one slot) may include one or more candidate resources (that is, candidate single-slot resources). In an actual application, the frequency domain range corresponding to the resource selection window may be selected based on an agreement in a used protocol or an actual application scenario. This is not limited in the method.

It should be noted that, in embodiments of this application, unless otherwise specified, a same understanding may be used for a meaning, a range, and a function of the resource selection window, and details are not described below again.

S302: The terminal device 11 monitors a second time domain resource set corresponding to the first time domain resource set.

The second time domain resource set includes a time domain resource on which a resource in the first time domain resource set can be reserved.

A periodic reservation is used as an example. It should be noted that, in embodiments of this application, the periodic reservation is a resource reservation performed for transmitting data of a periodic service. As shown in FIG. 10, it is assumed that the first time domain resource set includes a slot $t_1$ and a slot $t_2$. In addition, it is assumed that a resource reservation period set that is configured in a sidelink resource pool and that is for a partial sensing resource selection mode is $\phi_B$, and it is assumed that $\phi_B$ includes a resource reservation period $P_{gap1}$ and a resource reservation period $P_{gap2}$. In this case, the slot $t_1$ and the slot $t_2$ respectively correspond to two monitoring slots $t_1'$ and $t_1''$, and $t_2'$ and $t^{2}''$. It may be understood that the second time domain resource set includes $t_1'$, $t_1''$, $t_2'$, and $t_2''$. During specific implementation, a reserved resource for a periodic reservation may be determined through a resource reservation period field in SCI. When sending SCI in a slot $t_1'$, another terminal device may reserve a transmission resource in a slot $t_1$ at a resource reservation period $P_{gap1}$, that is, reserve, in the slot $t_1'$, a resource in the slot $t_1'$. When the monitoring resource in the second time domain resource set corresponding to the candidate resource in the first time domain resource set is determined through a periodic reservation relationship, a physical period in the resource reservation period set may be used, or a logical period corresponding to the physical period may be used. A correspondence between the physical period and the logical period is shown in the preceding description.

In addition, if a small resource reservation period exists in $\phi_B$, a case shown in FIG. 11 occurs. $\phi_B$ includes a resource reservation period $P_{gap3}$ and a resource reservation period $P_{gap4}$. Because the resource reservation period $P_{gap3}$ is less than an interval between a slot $t_1$ and a slot $t_2$, a monitoring slot $t_2'$ corresponding to the slot $t_2$ is located after the slot $t_1$.

A retransmission resource reservation is used as an example. It should be noted that, in embodiments of this application, the retransmission resource reservation is a resource reservation performed for transmitting retransmitted data. Specifically, the reservation may include a reservation of a retransmission resource that is not periodically reserved or a reservation of a retransmission resource that is periodically reserved. It is assumed that the first time domain resource set includes a slot $t_1$ and a slot $t_2$. As shown in FIG. 12A, a range of monitoring slots in which the slot $t_1$ can be reserved is $[t_1-m,t_1-1]$. A value of m is related to a used protocol. Only a time unit in the sidelink resource pool is considered for determining the monitoring slots $[t_1-m,t_1-1]$ in which the slot $t_1$ can be reserved. In other words, m and 1 in the foregoing range represent a logical interval, including only a quantity of time units in the sidelink resource pool. For example, a slot $t_1-m$ represents the $m_{th}$ slot before the slot $t_1$ in the sidelink resource pool. A slot $t_1-1$ represents the $1^{st}$ slot before the slot $t_1$ in the sidelink resource pool.

During specific implementation, a value of m may be preconfigured on the terminal device 11, or may be delivered by the network device to the terminal device 11 through configuration signaling. The configuration signaling may be a system information block SIB, radio resource control RRC signaling, or physical layer control information. In NR-V2X, m may be 31. In other words, a maximum logical interval between a retransmission resource that can be reserved in NR-V2X and a current transmission resource is 31 slots. In other words, a range in which any candidate resource slot $t_y^{SL}$ can be reserved is $[t_y^{SL}-31,t_y^{SL}-1]$. A time domain reservation of the retransmission resource may be determined through a time resource assignment field in SCI, and a frequency domain reservation of the retransmission resource may be determined through a frequency resource assignment field in the SCI. Likewise, as shown in FIG. 12B, a range of monitoring slots in which the slot $t_2$ can be reserved is $[t_2-m,t_2-1]$. It can be learned that the range of monitoring slots in which the slot $t_2$ can be reserved includes some slots after the slot $t_1$.

It is considered that for a retransmission resource reservation, a range in which any candidate resource slot $t_y^{SL}$ can be reserved is $[t_y^{SL}-m,t_y^{SL}-1]$. Therefore, for the time domain resource range monitored in the monitoring process described in S302, this application provides two possible designs.

A first possible design includes: The terminal device 11 performs monitoring in first duration. The first duration T' meets the following relationship:

$$T_{y1}-m \leq T' < n-P_0, \text{ where}$$

$T_{y1}$ is a time unit of a first candidate resource, the first candidate resource is the is resource in time domain in the first time domain resource set. A value of m may be preconfigured on the terminal device 11, or may be delivered by the network device to the terminal device 11 through configuration signaling. The configuration signaling may be a system information block SIB, radio resource control RRC signaling, or physical layer control information. m represents a maximum logical interval between a retransmission resource that can be reserved and a monitoring resource, that is, the earliest time unit in which another terminal device can reserve $T_{y1}$ as a retransmission resource is $T_{y1}-m$. The logical interval includes only a quantity of time units in sidelink resource pool, and this may also be understood. For example, in NR-V2X, m is 31. n is a time unit in which resource determining is triggered, and $P_0$ is first preset duration.

In other words, the first duration T' includes a sidelink time unit between a first time unit and a second time unit. The first time unit is a time unit (that is, $T_{y1}-m$) before the time unit of the first candidate resource with an interval of m from the time unit of the first candidate resource. The second time unit is a time unit (that is, $n-P_0$) before the time unit in which resource determining is triggered with an interval of first preset duration from the time unit in which resource determining is triggered.

A value of $P_0$ may be preconfigured on the terminal device 11, or may be delivered by the network device to the terminal device 11 through configuration signaling. The configuration signaling may be a system information block SIB, radio resource control RRC signaling, or physical layer control information. A value of $P_0$ may be related to a processing time required for performing SCI decoding. For example, a value of $P_0$ may be set to a processing time required for performing SCI decoding. The processing time may be related to a subcarrier spacing. For example, a relationship between the processing time and the subcarrier spacing is shown in Table 4:

TABLE 4

| Correspondence between a subcarrier spacing Δf and a processing time required for performing SCI decoding | |
| --- | --- |
| Δf (kHz) | Processing time required for performing SCI decoding (slots) |
| 15 | 1 |
| 30 | 2 |
| 60 | 3 |
| 120 | 4 |

In addition, a value of $P_0$ may also be set to duration greater than the processing time required for performing SCI decoding, to ensure that monitoring is completed before the time unit in which resource determining is triggered. For example, as shown in FIG. 13, a time domain resource after a moment $n-P_0$ is not monitored any more.

In the foregoing design, the terminal device 11 performs monitoring within the first duration, so that a monitoring resource corresponding to a retransmission resource reserved by another terminal device can be monitored, and a problem that the monitoring resource is located after the candidate resource is also avoided.

The second possible design includes: The terminal device 11 performs monitoring in second duration, where the second duration T" meets the following relationship:

$$T_{y1}-m \leq T'' < T_{y1}-P_1, \text{ where}$$

$T_{y1}$ is a time unit of a first candidate resource, the first candidate resource is the in resource in time domain in the first time domain resource set. A value of m may be preconfigured on the terminal device 11, or may be delivered by the network device to the terminal device 11 through configuration signaling. The configuration signaling may be a system information block SIB, radio resource control RRC signaling, or physical layer control information. m represents a maximum logical interval between a retransmission resource that can be reserved and a monitoring resource, that is, the earliest time unit in which another terminal device can reserve $T_{y1}$ as a retransmission resource is $T_{y1}-m$. The logical interval includes only a quantity of time units in sidelink resource pool. For example, in NR-V2X, m may be 31. $P_1$ is second preset duration.

In other words, the second duration T" includes a time unit between a first time unit and a third time unit. The first time unit is a time unit (that is, $T_{y1}-m$) before the time unit of the first candidate resource with an interval of m from the time unit of the first candidate resource, and the third time unit is a time unit (that is, $T_{y1}-P_1$) before the time unit of the first candidate resource with an interval of second preset duration from the time unit of the first candidate resource.

For example, a value of $P_1$ may be preconfigured on the terminal device 11, or may be delivered by the network device to the terminal device 11 through configuration signaling. The configuration signaling may be a system information block SIB, radio resource control RRC signaling, or physical layer control information. A value of $P_1$ may be related to one or more of a processing time required for performing SCI decoding, a processing time required for resource exclusion, a processing time required for reporting a resource exclusion result to a higher layer (for example, a MAC layer), a processing time required for the higher layer to complete a final resource selection procedure, and a processing time required for preparing to-be-transmitted information. For example, a value of $P_1$ may be set to a sum (referred to as duration A) of a processing time required for performing SCI decoding, a processing time required for resource exclusion, a processing time required for reporting a resource exclusion result to a higher layer (for example, a media access control (media access control, MAC) layer), a processing time required for the higher layer to complete a final resource selection procedure, and a processing time required for preparing to-be-transmitted information, or a value of $P_0$ is set to duration greater than the duration A, thereby ensuring that the to-be-transmitted information is sent before the time unit of the first candidate resource. For example, as shown in FIG. 14, a time domain resource after a moment $(t_1-P_1)$ is not monitored any more.

In the foregoing design, the terminal device 11 performs monitoring within the second duration, so that a monitoring resource corresponding to a retransmission resource reserved by another terminal device can be monitored, and a problem that the monitoring resource is located after the candidate resource is also avoided.

In addition, to monitor a monitoring resource corresponding to a periodic reservation performed by another terminal device, the problem that the monitoring resource is located after the candidate resource is avoided. For a time domain resource range monitored in a monitoring process described in S302, this application further provides other two possible designs.

A first possible design includes: The terminal device 11 ends the monitoring before $n-P_0$. In other words, when a monitoring resource corresponding to a periodic reservation performed by another terminal device is monitored, the monitoring may be performed in a manner of monitoring a monitoring resource corresponding to a periodic reservation before $n-P_0$.

In the method provided in embodiments of this application, a monitoring resource corresponding to a periodic reservation may be understood as that a monitoring resource of a candidate resource in the first time domain resource set may be reserved in the second time domain resource set in a periodic reservation manner. Unless otherwise specified, in embodiments of this application, a monitoring resource corresponding to a periodic reservation may be understood in the same way.

In other words, in this design, a time unit $T_{end}$ in which monitoring on the second time domain resource set is ended meets the following relationship:

$$T_{end} < n - P_0, \text{ where}$$

n is a time unit in which resource determining is triggered, and $P_0$ is first preset duration. For a meaning, a value setting manner, and a function that correspond to $P_0$, refer to the foregoing description.

It should be noted that, in embodiments of this application, unless otherwise specified, parameters represented by a same letter have a same meaning, a same value setting manner, and a same function. Details are not repeated. For example, in implementations and possible designs of the methods provided in embodiments of this application, meanings, value setting manners, and functions of the first preset duration $P_0$ are the same, meanings, value setting manners, and functions of the second preset duration $P_1$ are the same, and so does other preset duration. In addition, meanings, value setting manners, and functions of third preset duration $P_2$ described below are the same, meanings, value setting manners, and functions of fourth preset duration $P_3$ described below are the same, and meanings, value setting manners, and functions of fifth preset duration $P_4$ described below are the same.

In addition, it should be further noted that in embodiments of this application, the time unit $T_{end}$ in which sensing on the second time domain resource set is ended indicates that monitoring is not performed after the time unit $T_{end}$, that is, the time unit $T_{end}$ is the last time unit in which monitoring can be performed. In the following, in implementations and possible designs of the methods provided in embodiments of this application, unless otherwise specified, the time unit $T_{end}$ in which sensing on the second time domain resource set is ended may be understood similarly. It should be understood that, in embodiments of this application, unless otherwise specified, time units represented by a same letter represent time units with a same meaning.

In the foregoing design, the terminal device 11 ends the monitoring before $n-P_0$, so as to avoid a problem that when a monitoring resource corresponding to a periodic reservation is monitored, the monitoring resource may be located after the candidate resource.

A second possible design includes: The terminal device 11 ends the monitoring before $T_{y1}-P_1$. In other words, when a monitoring resource corresponding to a periodic reservation performed by another terminal device is monitored, the monitoring may be performed in a manner of monitoring a monitoring resource corresponding to a periodic reservation before $T_{y1}-P_1$.

In other words, in this design, a time unit $T_{end}$ in which monitoring on the second time domain resource set is ended meets the following relationship:

$$T_{end} < T_{y1} - P_1, \text{ where}$$

$T_{y1}$ is a time unit of a first candidate resource, and $P_1$ is second preset duration. For a manner of obtaining values of $T_{y1}$ and $P_1$, refer to the foregoing description.

In the foregoing design, the terminal device 11 ends the monitoring before $T_{y1}-P_1$, so as to avoid a problem that when a monitoring resource corresponding to a periodic reservation is monitored, the monitoring resource may be located after the candidate resource.

S303: The terminal device 11 performs resource exclusion and/or resource reporting before a time unit of a first candidate resource, or in the time unit of the first candidate resource, or in a time unit in which resource determining is triggered.

S303 includes three implementations. The following separately describes the three implementations included in S303.

A first implementation of S303 includes the following step.

S303*a*: The terminal device 11 performs resource exclusion and/or resource reporting before the time unit of the first candidate resource.

The first candidate resource is the $1^{st}$ resource in time domain in the first time domain resource set. For example, FIG. 10, FIG. 11, FIG. 12A, and FIG. 12B are used as an example. If the first time domain resource set includes a slot $t_1$ and a slot $t_2$, the time unit of the first candidate resource is the slot $t_1$, and the first candidate resource is one or more subchannels in the slot $t_1$.

Resource exclusion may be understood as: After the monitoring process described in S302 is ended, if a resource reserved by another terminal device is found in the first time domain resource set based on a result of the monitoring, a corresponding candidate resource is excluded from the first time domain resource set; or if no resource reserved by another terminal device is found in the first time domain resource set, the exclusion process may not be performed. For an implementation process of resource exclusion, refer to the foregoing processes of S102, S103, and S203 to S206. It should be understood that, in embodiments of this application, a same understanding may be used for an implementation process of resource exclusion unless otherwise described.

Resource reporting may be understood as: After the monitoring process described in S302 is ended, remaining candidate resources that can be used by the terminal device 11 for sending to-be-transmitted information after the resource exclusion are reported to a higher layer based on a result of the monitoring, so that the higher layer determines, from the resources, a candidate resource for sending the to-be-transmitted information. For a specific implementation process of resource reporting, refer to the foregoing descriptions of S207. It should be understood that, in embodiments of this application, a same understanding may be used for an implementation process of resource reporting unless otherwise described.

In addition, it may be understood that, in a running process of the terminal device 11, one of resource exclusion and resource reporting may be selected based on an actual requirement, or both resource exclusion and resource reporting may be performed, that is, resource exclusion is performed first, and then resource reporting is performed. This is not limited in this application.

In other words, in the implementation described in S303$a$, before the time unit of the first candidate resource, the terminal device 11 has stopped the monitoring process described in S302, so as to perform resource exclusion and/or resource reporting. In this way, a problem that some candidate resources become expired resources because a monitoring resource is located after some time domain resources in the first time domain resource set can be avoided. For example, in FIG. 11, the monitoring process described in S302 is stopped before the slot $t_1$ (the time unit of the first candidate resource), that is, $t_2$ is not monitored, and resource exclusion and/or resource reporting is performed. In this way, a candidate resource in the slot $t_1$ can be prevented from becoming an expired resource. In FIG. 12B, the monitoring process described in S302 is stopped before the slot $t_1$ (the time unit of the first candidate resource), that is, a part after the slot $t_1$ in a range $[t_2-m, t_2-1]$ of the monitoring slot is not monitored any more, and resource exclusion and/or resource reporting is performed. In this way, a candidate resource in the slot $t_1$ can be prevented from becoming an expired resource.

In a possible design, S303$a$ specifically includes:

S303$a$1. Perform resource exclusion and/or resource reporting in a time unit $T_{y1}-P_2$.

$T_{y1}$ is the time unit of the first candidate resource. $P_2$ is third preset duration. For example, a value of $P_2$ may be preconfigured on the terminal device 11, or may be delivered by the network device to the terminal device 11 through configuration signaling. The configuration signaling may be a system information block SIB, radio resource control RRC signaling, or physical layer control information. A value of $P_2$ may be related to one or more of a processing time required for performing SCI decoding, a processing time required for resource exclusion, a processing time required for reporting a resource exclusion result to a higher layer (for example, a MAC layer), a processing time required for the higher layer to complete a final resource selection procedure, and a processing time required for preparing to-be-transmitted information. For example, a sum of a processing time required for resource exclusion, a processing time required for reporting a resource exclusion result to a higher layer (for example, a MAC layer), a processing time required for the higher layer to complete a final resource selection procedure, and a processing time required for preparing to-be-transmitted information is used as a value of $P_2$, to ensure that a resource selection process is completed before the time unit of the first candidate resource, so as to send information.

In embodiments of this application, that resource exclusion and/or resource reporting is performed in a time unit (denoted as a time unit a) may be understood as that resource exclusion and/or resource reporting is performed starting from the time unit a, or may be understood as that resource exclusion and/or resource reporting is triggered in the time unit a. That resource exclusion and/or resource reporting is performed starting from the time unit a may be specifically: Resource exclusion is performed starting from the time unit a, and then resource reporting is performed. A time unit in which resource exclusion is performed may be the same as or different from a time unit in which resource reporting is performed. For example, resource exclusion may be performed first, and then resource reporting is performed. That resource exclusion and/or resource reporting is triggered in the time unit a may be specifically: Resource exclusion and/or reporting is triggered in the time unit a, and resource exclusion and/or resource reporting is performed in a time unit b after the time unit a. For example, resource exclusion may be performed first, and then resource reporting is performed. It should be understood that in embodiments of this application, unless otherwise specified, a same understanding may be used for a process of performing resource exclusion and/or resource reporting in a time unit.

For example, in S303$a$1, that resource exclusion and/or resource reporting is performed in a time unit $T_{y1}-P_2$ may mean that resource exclusion is started in the time unit $T_{y1}-P_2$, and resource reporting started in a time unit after the time unit $T_{y1}-P_2$; or that resource exclusion and/or resource reporting is performed in a time unit $T_{y1}-P_2$ may mean that resource exclusion and/or resource reporting is triggered in the time unit $T_{y1}-P_2$, so that resource exclusion is performed in a time unit after the time unit $T_{y1}-P_2$, and resource reporting is performed in a time unit after the resource exclusion is performed.

In addition, when resource exclusion is performed before the time unit of the first candidate resource, for a time domain resource range monitored in the monitoring process in S302, as described in S302, this application provides the following four possible designs.

In the first possible design, the terminal device 11 may perform monitoring in first duration T' (where $T_{y1}-m \leq T'<n-P_0$, for definitions and value setting manners of $T_{y1}$, m, n, and $P_0$, refer to corresponding descriptions in S302, and details are not described herein again), to monitor a monitoring resource corresponding to a retransmission resource reserved by another terminal device.

In the second possible design, the terminal device 11 may perform monitoring in second duration T" (where $T_{y1}-m \leq T''<T_{y1}-P_1$, for definitions and value setting manners of $T_{y1}$, m, and $P_1$, refer to corresponding descriptions in S302, and details are not described herein again), to monitor a monitoring resource corresponding to a retransmission resource reserved by another terminal device.

In the third possible design, the terminal device 11 may end monitoring before $n-P_0$ (for definitions and value setting manners of n and $P_0$, refer to corresponding descriptions in S302, and details are not described herein again). In other words, when a monitoring resource corresponding to a periodic reservation performed by another terminal device is monitored, the monitoring may be performed in a manner of monitoring a monitoring resource corresponding to a periodic reservation before $n-P_0$, so as to avoid a problem that when a monitoring resource corresponding to a periodic reservation performed by another terminal device is monitored, the monitoring resource may be located after the candidate resource.

In the fourth possible design, the terminal device 11 may end monitoring before $T_{y1}-P_1$ (for definitions and value setting manners of $T_{y1}$ and $P_0$, refer to corresponding descriptions in S302, and details are not described herein again). In other words, when a monitoring resource corresponding to a periodic reservation performed by another terminal device is monitored, the monitoring may be performed in a manner of monitoring a monitoring resource corresponding to a periodic reservation before $T_{y1}-P_1$, so as to avoid a problem that when a monitoring resource corresponding to a periodic reservation performed by another terminal device is monitored, the monitoring resource may be located after the candidate resource.

The second implementation of S303 includes the following step.

S303b: The terminal device 11 performs resource exclusion and/or resource reporting in the time unit in which resource determining is triggered.

In other words, in the implementation described in S303b, the terminal device 11 has stopped, in the time unit in which resource determining is triggered, the monitoring process described in S302, to perform resource exclusion and/or resource reporting. In this way, a problem that some candidate resources become expired resources because a monitoring resource is located after some time domain resources in the first time domain resource set can be avoided. For example, in FIG. 11, the monitoring process described in S302 is stopped before the time unit n for triggering resource determining, that is, $t_2'$ is not monitored, and resource exclusion and/or resource reporting is performed. In this way, a candidate resource in the slot $t_1$ can be prevented from becoming an expired resource. In FIG. 12B, the monitoring process described in S302 is stopped before the time unit n for triggering resource determining, that is, a part after the slot $t_1$ in a range $[n,t_2-1]$ of the monitoring slot is not monitored any more, and resource exclusion and/or resource reporting is performed. In this way, a candidate resource in the slot $t_1$ can be prevented from becoming an expired resource.

When resource exclusion is performed before the time unit in which resource determining is triggered, for a time domain resource range monitored in the monitoring process in S302, this application provides the following two possible designs.

In the first possible design, the terminal device 11 may perform monitoring in first duration T' (where $T_{y1}-m \le T' < n - P_0$, for definitions and value setting manners of $T_{y1}$, m, n, and $P_0$, refer to corresponding descriptions in S302, and details are not described herein again), to monitor a monitoring resource corresponding to a retransmission resource reserved by another terminal device.

In the second possible design, the terminal device 11 may end monitoring before $n-P_0$ (for definitions and value setting manners of n and $P_0$, refer to corresponding descriptions in S302, and details are not described herein again). In other words, when a monitoring resource corresponding to a periodic reservation performed by another terminal device is monitored, the monitoring may be performed in a manner of monitoring a monitoring resource corresponding to a periodic reservation before $n-P_0$, so as to avoid a problem that when a monitoring resource corresponding to a periodic reservation performed by another terminal device is monitored, the monitoring resource may be located after the candidate resource.

The third implementation of S303 includes the following step.

S303c: The terminal device 11 performs resource exclusion and/or resource reporting in the time unit of the first candidate resource.

The first candidate resource is the $1^{st}$ resource in time domain in the first time domain resource set. For details, refer to the foregoing descriptions of $T_{y1}$. For example, FIG. 10, FIG. 11, FIG. 12A, and FIG. 12B are used as an example. If the first time domain resource set includes a slot $t_1$ and a slot $t_2$, the time unit of the first candidate resource is the slot $t_1$, the first candidate resource is one or more subchannels in the slot $t_1$.

In the implementation described in S303c, it is considered that one or more of a processing time of resource exclusion, a processing time corresponding to resource reporting, a processing time required by a higher layer to complete a final resource selection procedure, and a processing time required for preparing to-be-transmitted information may be zero, or it may be understood that the foregoing process may not need to occupy a processing time separately. In this case, even if resource exclusion and/or resource reporting is started in the time unit of the first candidate resource, the first candidate resource does not become an expired resource. Therefore, in this implementation, through the means of performing resource exclusion and/or resource reporting in the time unit of the first candidate resource, thereby preventing the monitoring process from being ended too early because resource exclusion and/or resource reporting is performed too early while preventing the candidate resource from becoming an expired resource.

Second Aspect

As shown in FIG. 15, the method includes the following steps.

S401: The terminal device 11 determines a first time domain resource set in a resource selection window.

For a meaning, a range, and a function of the resource selection window, refer to corresponding content in S301. Details are not described herein again.

The first time domain resource set is for sidelink transmission.

S402: The terminal device 11 monitors a second time domain resource set corresponding to the first time domain resource set.

The second time domain resource set may be a set of time domain resources on which a resource in the first time domain resource set can be reserved.

The second time domain resource set is located before the first time domain resource set. In other words, any time domain resource in the second time domain resource set is located before each time domain resource in the first time domain resource set.

That is, in the method provided in the second aspect, when the terminal device 11 determines each first time domain resource in the first time domain resource set in the resource selection window in S401, a time domain resource whose corresponding monitoring resources are all located before the first time domain resource set should be selected as the first time domain resource, that is, a set of monitoring resources (that is, the second time domain resource set) corresponding to all first time domain resources in the first time domain resource set is located before the first time domain resource set. In this way, a problem that some candidate resources become expired resources because a monitoring resource is located after some time domain resources in the first time domain resource set can be avoided.

A periodic reservation is used as an example. As shown in FIG. 10, it is assumed that a resource reservation period set that is configured for a sidelink resource pool and that is for a partial sensing resource selection mode is $\phi_B$, and it is assumed that $\phi_B$ includes a reservation period $P_{gap1}$ and a reservation period $P_{gap2}$. In this case, the slot $t_1$ and the slot $t_2$ respectively correspond to two monitoring slots $t_1'$ and $t_1''$, and $t_2'$ and $t_2''$. It may be learned that, monitoring slots, $t_1'$ and $t_1''$, and $t_2'$ and $t_2''$, corresponding to a slot $t_1$ and a slot $t_2$ are all located before the slot $t_1$ and the slot $t_2$. In this case, the slot $t_1$ and the slot $t_2$ may be used as resources in the first time domain resource set, and further, the second time domain resource set includes $t_1'$, $t_2''$, $t_2'$, and $t_2''$.

In another example, in FIG. 11, because the monitoring slot $t_2'$ is after the slot 1, the slot $t_1$ and the slot $t_2$ cannot be used as resources in the first time domain resource set together. In this case, there are two possible manners: First, the slot $t_2$ is used as a resource in the first time domain resource set, and the slot $t_1$ is excluded from the first time domain resource set, that is, a resource in the slot $t_1$ is not used as a candidate resource for the terminal device 11 to send information, that is, the slots $t_1'$ and $t_1''$ are not monitored. Second, the slot $t_1$ is used as a resource in the first time domain resource set, and the slot $t_2$ is excluded from the first time domain resource set, that is, a resource in the slot $t_2$ is not used as a candidate resource for the terminal device 11 to send information, that is, the slots $t_2'$ and $t_2'$ are not monitored.

In addition, for a retransmission resource reservation, as described in FIG. 12A and FIG. 12B above, a resource range in which any candidate resource (for example, a candidate resource $t_y^{SL}$) can be reserved is a continuous interval (that is, $[t_y^{SL}-m, t_y^{SL}-1]$). Therefore, to ensure that the second time domain resource set is before the first time domain resource set, when a monitoring resource corresponding to a retransmission resource reserved by another terminal device is determined, a time domain resource before the first time domain resource set may be used as the monitoring resource corresponding to the retransmission resource.

It should be noted that, in embodiments of this application, a monitoring resource corresponding to a retransmission resource may be understood as that a monitoring resource of a candidate resource in the first time domain resource set may be reserved in the second time domain resource set in a retransmission resource reservation manner.

In addition, in the method provided in the second aspect, after S402 is performed, that is, after monitoring on the second time domain resource set is ended, resource exclusion and resource reporting may be performed based on a result of the monitoring, so as to determine a candidate resource for sending the to-be-transmitted information. For implementation processes of resource exclusion and resource reporting, refer to corresponding descriptions in the method provided in the first aspect. Details are not described herein again.

In the foregoing method, when each first time domain resource in the first time domain resource set is determined in the resource selection window, a time domain resource whose corresponding monitoring resources are all located before the first time domain resource set is selected as the first time domain resource, that is, a set of monitoring resources (that is, the second time domain resource set) corresponding to each first time domain resource in the first time domain resource set is located before the first time domain resource set. In this way, a problem that some candidate resources become expired resources because a monitoring resource is located after some time domain resources in the first time domain resource set can be avoided.

In addition, when the second time domain resource set is located before the first time domain resource set, the following two implementations are provided for a location of the second time domain resource set in embodiments of this application.

Implementation 1

That the second time domain resource set is located before the first time domain resource set may specifically mean that the monitoring on the second time domain resource set is ended before a time unit in which resource determining is triggered. It may also be understood that the second time domain resource set is located before the time unit in which resource determining is triggered.

In other words, in a solution of implementation 1, when the first time domain resource set is determined in the resource selection window in S4o1, it is required that monitoring resources of first time domain resources in the first time domain resource set are all located before the time unit in which resource determining is triggered. It may also be understood as follows: When the first time domain resources in the first time domain resource set are determined in the resource selection window, a time domain resource whose corresponding monitoring resource is located before the time unit in which resource determining is triggered is selected as the first time domain resource.

In the foregoing implementation, it is considered that after the monitoring ends, a process, such as resource exclusion and/or resource reporting, further needs to be performed based on a result of the monitoring. Therefore, the monitoring is ended before the time unit in which resource determining is triggered, so that a time can be reserved for subsequent processes such as resource exclusion and/or resource reporting, to prevent some candidate resources in the first time domain resource set from becoming expired resources.

In a possible design, in the method, that the monitoring on the second time domain resource set is ended before the time unit in which resource determining is triggered may mean that the time unit $T_{end}$ in which the monitoring on the second time domain resource set is ended meets the following relationship:

$$T_{end} < n - P_0, \text{ where}$$

$P_0$ is first preset duration, and n is a time unit in which resource determining is triggered.

In other words, the time unit $T_{end}$ in which the monitoring on the second time domain resource set is ended is located before the second time unit. The second time unit is a time unit (that is, $n - P_0$) of first preset duration before the time unit in which resource determining is triggered.

A value of $P_0$ may be preconfigured on the terminal device 11, or may be delivered by the network device to the terminal device 11 through configuration signaling. The configuration signaling may be a system information block SIB, radio resource control RRC signaling, or physical layer control information. A value of $P_0$ may be related to a processing time required for performing SCI decoding. For example, a value of $P_0$ may be set to a processing time required for performing SCI decoding, or a value of $P_0$ may also be set to duration greater than the processing time required for performing SCI decoding, to ensure that monitoring is completed before the time unit in which resource determining is triggered.

For example, in FIG. 16, monitoring on the second time domain resource set is ended before $n-P_0$. Because a monitoring resource corresponding to a periodic reservation of a slot $t_2$ includes a slot $t_2'$ (the slot $t_2'$ is after $n-P_0$), the first time domain resource set may include the slot $t_1$, but cannot include the slot $t_2$. In other words, the second time domain resource set may include the slot $t_1'$ and the slot $t_1''$, and the second time domain resource set cannot include the slot $t_2'$ and the slot $t_2''$.

In addition, when the monitoring on the second time domain resource set is ended before the time unit in which resource determining is triggered, that is, when the second time domain resource set is located before the time unit in which resource determining is triggered and so on, S401 has the following two possible designs:

In a first possible design, the first time domain resource set is located before a third time domain resource.

The third time domain resource is located after the time unit in which resource determining is triggered with an interval of fourth preset duration from the time unit in which resource determining is triggered.

In other words, a distance between a time unit of the last time domain resource in the first time domain resource set and the time unit in which resource determining is triggered is less than the fourth preset duration.

In the foregoing design, a distance between a time unit of the last time domain resource in the first time domain resource set and the time unit in which resource determining is triggered is less than the fourth preset duration, so that a periodically reserved monitoring resource can be avoided from being located after the time unit in which resource determining is triggered, thereby avoiding a case in which the periodically reserved monitoring resource is located after the candidate resource. For example, in FIG. 10, when an interval between a slot $t_2$ (the last time domain resource in the first time domain resource set) and the time unit n for triggering resource determining is small enough, or when an interval between a slot $t_2$ and the time unit n for triggering resource determining is small enough compared with a period $P_{gap1}$, periodically reserved monitoring resources corresponding to time domain resources in the first time domain resource set are all located before the time unit in which resource determining is triggered. In FIG. 11, because the interval between the slot $t_2$ and the time unit n for triggering resource determining is excessively large, an interval between time domain resources (that is, $t_1$ and $t_2$) in the first time domain resource set is large. As a result, a periodically reserved monitoring slot $t_2'$ corresponding to the slot $t_2$ is located after $t_1$.

Optionally, a value of the fourth preset duration $P_3$ may be related to at least one of a size of a minimum resource reservation period $P_{gap\_min}$ in a period set $\phi_B$ or a processing time $T_{proc,0}$ required for performing SCI decoding. The period set $\phi_B$ is a resource reservation period set that is configured for a sidelink resource pool and that is for a partial sensing resource selection mode.

For example, a value of $P_3$ may be set to $P_{gap}-T_{proc,0}$. In this case, a time unit of the third time domain resource is $n+P^{gap}-T_{proc,0}$ that is, a time unit $T_{y2}$ of the last time domain resource in the first time domain resource set meets $T_{y2}<n+P_{gap}-T_{proc,0}$. Alternatively, it may be understood that an interval between a time unit of the last time domain resource in the first time domain resource set and $n-T_{proc,0}$ is less than $P_{gap}$, that is, $T_{y2}-(n-T_{proc,0})<P_{gap}$. In this way, it can be ensured that periodically reserved monitoring resources corresponding to the last time domain resource in the first time domain resource set are all located before $n-T_{proc,0}$, that is, periodically reserved monitoring resources corresponding to all time domain resources in the first time domain resource set are all located before $n-T_{proc,0}$.

In addition, because an interval between the time unit of the last time domain resource in the first time domain resource set and $n-T_{proc,0}$ is less than $P_{gap}$, in other words, a quantity of time domain resources in the first time domain resource set cannot exceed $P_{gap}-T_{proc,0}-T_1$. $T_1$ represents an interval between a lower bound of the resource selection window $[n+T_1,n+T_2]$ and a time unit n for triggering resource determining. For example, when the first time domain resource set is determined from the resource selection window, a quantity of slots included in the first time domain resource set cannot exceed $P_{gap}-T_{proc,0}-T_1$.

In the foregoing design, it is considered that if a minimum period (that is, a minimum period in a period set $\phi_B$) in all period configurations supported by partial sensing is small, a location of the last time domain resource in the first time domain resource set may be high, and consequently, a quantity of time domain resources in the first time domain resource set is small. Therefore, a threshold of a minimum value may be set for the period set $\phi_B$, that is, the minimum period in the period set $\phi_B$ is required to be greater than or equal to a first period threshold, so as to ensure that the first time domain resource set includes a large quantity of time domain resources.

In a second possible design, selection of the first time domain resource set needs to ensure that the terminal device 11 can perform monitoring in first duration. The first duration T' meets the following relationship:

$$T_{y1}-m \leq T' < n-P_0, \text{ where}$$

$T_{y1}$ is the time unit of the first candidate resource. For example, a value of m may be preconfigured on the terminal device 11, or may be delivered by the network device to the terminal device 11 through configuration signaling. The configuration signaling may be a system information block SIB, radio resource control RRC signaling, or physical layer control information. m represents a maximum logical interval between a retransmission resource that can be reserved and a monitoring resource, that is, the earliest time unit in which another terminal device can reserve $T_{y1}$ as a retransmission resource is $T_{y1}-m$. The logical interval includes only a quantity of time units in sidelink resource pool. For example, in NR-V2X, m may be 31. n is a time unit in which resource determining is triggered, and $P_0$ is first preset duration.

In other words, the first duration T' includes a time unit between a first time unit and a second time unit. The first time unit is a time unit (that is, $T_{y1}-m$) before the time unit of the first candidate resource with an interval of m from the time unit of the first candidate resource, and the second time unit is a time unit (that is, $n-P_0$) before the time unit in which resource determining is triggered with an interval of first preset duration from the time unit in which resource determining is triggered.

For an obtaining manner and a value setting manner of the first preset duration $P_0$, refer to the foregoing descriptions of the first preset duration $P_0$. Details are not repeated.

Optionally, in this method, an interval between the time unit $T_{y1}$ of the first candidate resource in the first time domain resource set and $n-P_0$ is less than m. For definitions and values of m and n, refer to the foregoing descriptions.

The interval between the time unit of the first candidate resource in the first time domain resource set and $n-P_0$ is less than m, so that it can be ensured that the first duration T' is not an empty set, that is, it can be ensured that a reservation of a retransmission resource by another terminal device is sensed.

Implementation 2

That the second time domain resource set is located before the first time domain resource set may specifically mean that the monitoring on the second time domain resource set is ended before a time unit of a first candidate resource.

The first candidate resource is the $1^{st}$ resource in time domain in the first time domain resource set.

In other words, in a solution of implementation 2, when the first time domain resource set is determined in the resource selection window in S401, it is required that monitoring resources of first time domain resources in the first time domain resource set are all located before the first time domain resource set. It may also be understood as follows: When the first time domain resources in the first time domain resource set are determined in the resource selection window, a time domain resource whose corresponding monitoring resources are all located before the first time domain resource set is selected as the first time domain resource.

In the foregoing implementation design, it is considered that after the monitoring is ended, processes, such as resource exclusion and/or resource reporting, further need to be performed based on a result of the monitoring. Therefore, the monitoring is ended before the time unit of the first candidate resource, so that a time can be reserved for subsequent processes, such as resource exclusion and/or resource reporting, to prevent some candidate resources in the first time domain resource set from becoming expired resources.

$T_{y1}$ is the time unit of the first candidate resource, and $P_1$ is second preset duration.

In other words, the time unit $T_{end}$ in which the monitoring on the second time domain resource set is ended is located before the third time unit. The third time unit is a time unit of second preset duration (that is, $T_{y1}-P_1$) before the time unit of the first candidate resource.

A value of $P_1$ may be preconfigured on the terminal device 11, or may be delivered by the network device to the terminal device 11 through configuration signaling. The configuration signaling may be a system information block SIB, radio resource control RRC signaling, or physical layer control information. A value of $P_0$ may be related to a processing time required for performing SCI decoding. A value of $P_1$ may be related to one or more of a processing time required for resource exclusion, a processing time required for reporting a resource exclusion result to a higher layer (for example, a MAC layer), a processing time required for the higher layer to complete a final resource selection procedure, a time required for sending to-be-transmitted information, and a processing time required for performing SCI decoding. For other descriptions of the second preset duration $P_1$, refer to corresponding content in the method described in the first aspect. Details are not described herein again.

For example, in FIG. 17, monitoring on the second time domain resource set is ended before $t_1-P_1$. Because a monitoring resource corresponding to a periodic reservation of a slot $t_2$ includes a slot $t_2'$ (the slot $t_2'$ is after $t_1-P_1$), the first time domain resource set may include the slot $t_1$, but cannot include the slot $t_2$. In other words, the second time domain resource set may include the slot $t_1'$ and the slot $t_1''$, and the second time domain resource set cannot include the slot $t_2'$ and the slot $t_2''$.

In addition, when the monitoring on the second time domain resource set is ended before the time unit of the first candidate resource, that is, when the second time domain resource set is located before the time unit of the first candidate resource, and so on, S401 has the following two possible designs:

In a first possible design, the first time domain resource set is located before a fourth time domain resource.

The fourth time domain resource is located after the first candidate resource with an interval of fifth preset duration from the first candidate resource.

In other words, a distance between a time unit of the last time domain resource in the first time domain resource set and the time unit of the first candidate resource is less than the fifth preset duration.

In the foregoing design, a distance between a time unit of the last time domain resource in the first time domain resource set and the time unit of the first candidate resource is less than the fifth preset duration, so as to avoid a case in which a periodically reserved monitoring resource is located after the candidate resource. For example, in FIG. 10, when an interval between a slot $t_2$ (the last time domain resource in the first time domain resource set) and the first candidate resource (that is, a slot $t_1$) is small enough, periodically reserved monitoring resources corresponding to each time domain resource in the first time domain resource set are all located before the time unit in which resource determining is triggered. In FIG. 11, because an interval between a slot $t_2$ and a first candidate resource (that is, a slot $t_1$) is excessively large, a periodically reserved monitoring slot $t_2'$ corresponding to the slot $t_2$ is located behind $t_1$.

Optionally, a value of the fifth preset duration $P_4$ may be related to one or more of a processing time required for resource exclusion, a processing time required for reporting a resource exclusion result to a higher layer (for example, a MAC layer), a processing time required for the higher layer to complete a final resource selection procedure, a time required for sending to-be-transmitted information, a size of a minimum period $P_{gap\_min}$ in a period set $\phi_B$, and a processing time $T_{proc,0}$ required for performing SCI decoding. The period set $\phi_B$ is a resource reservation period set that is configured for a sidelink resource pool and that is for a partial sensing resource selection mode.

For example, a value of $P_4$ may be set to $P_{gap\_min}-T_{proc,0}-T_{proc,1}$. $T_{proc,0}$ represents a processing time required for performing SCI decoding, and $T_{proc,1}$ represents some or all of a processing time required for resource exclusion, a processing time required for reporting a resource exclusion result to a higher layer (for example, a MAC layer), a processing time required for the higher layer to complete a final resource selection procedure, and a time required for sending to-be-transmitted information.

In this case, a time unit of the fourth time domain resource is $T_{y1}+P_{gap\_min}-T_{proc,0}-T_{proc,1}$, where $T_{y1}$ represents a time unit of the is time domain resource in the first time domain resource set. That is, a time unit $T_{y2}$ of the last time domain resource in the first time domain resource set meets $T_{y2} < T_{y1} + P_{gap\_min} - T_{proc,0} - T_{proc,1}$. Alternatively, it may be understood that an interval between a time unit of the last time domain resource in the first time domain resource set and $T_{y1} - T_{proc,0} - T_{proc,1}$ is less than $P_{gap\_min}$, that is, $T_{y2} - (T_{y1} - T_{proc,0} - T_{proc,1}) < P_{gap\_min}$. In this way, it can be ensured that periodically reserved monitoring resources corresponding to the last time domain resource in the first time domain resource set are all located before $T_{y1} - T_{proc,0} - T_{proc,1}$, that is, periodically reserved monitoring resources corresponding to all time domain resources in the first time domain resource set are all located before $T_{y1} - T_{proc,0} - T_{proc,1}$.

In addition, because an interval between the time unit of the last time domain resource in the first time domain resource set and $T_{y1} - T_{proc,0} - T_{proc,1}$ is less than $P_{gap\_min}$, in other words, a quantity of time domain resources in the first time domain resource set cannot exceed $P_{gap} - T_{proc,0} - T_{proc,1}$. For example, when the first time domain resource set is determined from the resource selection window, a quantity of slots included in the first time domain resource set cannot exceed $P_{gap} - T_{proc,0} - T_{proc,1}$.

In the foregoing design, it is considered that if a minimum period (that is, a minimum period in a period set $\phi_B$) in all period configurations supported by partial sensing is small, a location of the last time domain resource in the first time domain resource set may be high, and consequently, a quantity of time domain resources in the first time domain resource set is small. Therefore, a threshold of a minimum value is set for the period set $\phi_B$, that is, the minimum period in the period set $\phi_B$ is required to be greater than or equal to a first period threshold, so as to ensure that the first time domain resource set includes a large quantity of time domain resources.

In a second possible design, selection of the first time domain resource set needs to ensure that the terminal device 11 can perform monitoring in second duration. The second duration T" meets the following relationship:

$$T_{y1} - m \leq T'' < T_{y1} - P_1, \text{ where}$$

$T_{y1}$ is the time unit of the first candidate resource, and a value of m may be preconfigured on the terminal device 11, or may be delivered by the network device to the terminal device 11 through configuration signaling. The configuration signaling may be a system information block SIB, radio resource control RRC signaling, or physical layer control information. m represents a maximum logical interval between a retransmission resource that can be reserved and a monitoring resource, that is, the earliest time unit in which another terminal device can reserve $T_{y1}$ as a retransmission resource is $T_{y1} - m$. The logical interval includes only a quantity of time units in sidelink resource pool. For example, in NR-V2X, m may be 31. n is a time unit in which resource determining is triggered, and $P_0$ is first preset duration.

In other words, the second duration T" includes a time unit between a first time unit and a third time unit. The first time unit is a time unit (that is, $T_{y1} - m$) before the time unit of the first candidate resource with an interval of m from the first candidate resource, and the third time unit is a time unit (that is, $T_{y1} - P_1$) before the time unit of the first candidate resource with an interval of second preset duration from the first candidate resource.

For an obtaining manner and a value setting manner of the first preset duration $P_1$, refer to the foregoing descriptions of the first preset duration $P_1$. Details are not repeated.

Optionally, in this method, an interval between the time unit $T_{y1}$ of the first candidate resource in the first time domain resource set and $T_{y1} - P_1$ is less than m. It may also be understood that in this method, $P_1$ is less than m. For definitions and values of m and $P_1$, refer to the foregoing descriptions.

The interval between the time unit of the first candidate resource in the first time domain resource set and $T_{y1} - P_1$ is less than m, so that it can be ensured that the first duration T' is not an empty set, that is, it can be ensured that a reservation of a retransmission resource by another terminal device is sensed.

Third Aspect

As shown in FIG. 18, the method includes the following steps.

S501: The terminal device 11 determines a first time domain resource set in a resource selection window.

For a definition and a range of the resource selection window, refer to corresponding content in S301. Details are not described herein again.

The first time domain resource set is for sidelink transmission. For a range and a determining manner of the first time domain resource set, refer to corresponding content in S301. Details are not described herein again.

S502: The terminal device 11 excludes, when a first monitoring resource is after a time unit in which resource determining is triggered or a time unit of a first candidate resource, a second candidate resource corresponding to the first monitoring resource from the first time domain resource set.

The first candidate resource is the $1^{st}$ resource in time domain in the first time domain resource set.

The first monitoring resource may include some or all monitoring resources of a candidate resource (that is, the second candidate resource) in the first time domain resource set.

For example, when the first monitoring resource is some monitoring resources of the second candidate resource, the second candidate resource is excluded from the first time domain resource set when the some monitoring resources of the second candidate resource are all after the time unit in which resource determining is triggered or after the time unit of the first candidate resource. As shown in FIG. 11, it is assumed that the first time domain resource set includes a slot $t_1$ and a slot $t_2$, monitoring resources of the slot $t_1$ include $t_1'$ and $t_1''$, and monitoring resources of the slot $t_2$ include $t_2'$ and $t_2''$. It can be learned that, $t_2'$ is located after the time unit n for triggering resource determining and the slot $t_1$, that is, some monitoring resources of the slot $t_2$ are located after the time unit in which resource determining is triggered or after the time unit of the first candidate resource. Therefore, the slot $t_2$ is excluded from the first time domain resource set.

In another example, when the first monitoring resource is all monitoring resources of the second candidate resource, the second candidate resource is excluded from the first time domain resource set when the monitoring resources of the second candidate resource are all after the time unit in which resource determining is triggered or after the time unit of the first candidate resource. FIG. 11 is still used as an example. Although $t_2'$ is located after the time unit n for triggering resource determining and the slot $t_1$, $t_2''$ is located after the time unit in which resource determining is triggered and before the slot $t_1$. Therefore, not all monitoring resources of the slot $t_2$ are located after the time unit in which resource determining is triggered or the time unit of the first candidate resource. In this case, the slot $t_2$ is not excluded from the first time domain resource set.

The following describes two implementations included in S502.

Implementation 1: S502 includes the following step.

S502*a*: The terminal device 11 excludes, when the first monitoring resource is after the time unit in which resource determining is triggered, the second candidate resource corresponding to the first monitoring resource from the first time domain resource set.

In this implementation, the first monitoring resource may be understood as a resource that is, in time domain, after the time unit in which resource determining is triggered.

For example, as shown in FIG. 19, the first time domain resource set includes a slot $t_1$ and a slot $t_2$, and the period set $\phi_B$ includes a period $P_{gap5}$ and a period $P_{gap6}$. In this case, periodically reserved monitoring resources corresponding to the slot $t_1$ include a slot $t_1'$ and a slot $t_2''$, and periodically reserved monitoring resources corresponding to the slot $t_2$ include a slot $t_2'$ and a slot $t_2''$. It may be learned that the slot $t_2'$ is located after the time unit in which resource determining is triggered, and the slot $t_2$ corresponding to the slot $t_2'$ is excluded from the first time domain resource set. In this case, the slot $t_2'$ is equivalent to the first monitoring resource, and the slot $t_2$ is equivalent to a second candidate resource corresponding to the first monitoring resource.

Implementation 2: S502 includes the following step.

S502*b*: The terminal device 11 excludes, when the first monitoring resource is after the time unit of the first candidate resource, the second candidate resource corresponding to the first monitoring resource from the first time domain resource set.

In this implementation, the first monitoring resource may be understood as a resource that is, in time domain, after the time unit of the first candidate resource. For example, in FIG. 11, if a slot $t_2'$ is located after a slot $t_1$ (the first candidate resource), a slot $t_2$ corresponding to the slot $t_2'$ is excluded from the first time domain resource set. In this case, the slot $t_2'$ is equivalent to the first monitoring resource, and the slot $t_2$ is equivalent to a second candidate resource corresponding to the first monitoring resource.

After the second candidate resource is excluded from the first time domain resource set, the method further includes the following step.

S503: The terminal device 11 monitors a second time domain resource set corresponding to remaining time domain resources in the first time domain resource set.

After monitoring on the second time domain resource set corresponding to the remaining time domain resources in the first time domain resource set is ended, resource exclusion and resource reporting may be performed based on a result of the monitoring, so that a candidate resource for sending the to-be-transmitted information may be determined. For implementation processes of resource exclusion and resource reporting, refer to corresponding descriptions in the method provided in the first aspect. Details are not described herein again.

For processes such as monitoring the second time domain resource set corresponding to the remaining time domain resources in the first time domain resource set and performing resource exclusion and resource reporting based on a result of the monitoring, refer to the foregoing content. Details are not described herein again.

In the foregoing method, when the first monitoring resource is after the time unit in which resource determining is triggered or the time unit of the first candidate resource, a second candidate resource corresponding to the first monitoring resource is excluded from the first time domain resource set, so as to ensure that the second time domain resource set does not include a time domain resource located after the time unit in which resource determining is triggered or the time domain resource in the first resource set, thereby avoiding a problem that some candidate resources are discarded, and improving utilization of candidate resources included in the first resource set. In addition, because the second time domain resource set does not include a time domain resource located after the time unit in which resource determining is triggered or the time domain resource in the first resource set, a time domain resource located after the time unit in which resource determining is triggered or the time domain resource in the first resource set does not need to be monitored, so that a resource for sending information can be selected as early as possible, thereby reducing an information sending delay.

In a possible design, the method further includes the following step.

S504: The terminal device 11 determines a fourth candidate resource set from a third candidate resource set based on a result of the monitoring.

The third candidate resource set is a set of remaining time domain resources in the first time domain resource set.

For example, after the second time domain resource set corresponding to the set of remaining time domain resources in the first time domain resource set is monitored, a result of the monitoring is obtained, and resource exclusion is performed, that is, the fourth candidate resource set is determined from the third candidate resource set. For an implementation process of resource exclusion, refer to the foregoing description. Details are not described herein again.

In a possible implementation, after the fourth candidate resource set is determined, the method further includes the following step.

S505*a*: The terminal device 11 determines, from the fourth candidate resource set and a second candidate resource set based on a priority corresponding to the fourth candidate resource set and a priority corresponding to the second candidate resource set, a resource for transmitting information.

The second candidate resource set is a set of candidate resources of monitoring resources that are after the time unit in which resource determining is triggered or the time unit of the first candidate resource. That is, the second candidate resource set is a set of resources excluded from the first time domain resource set through S502.

For example, after completing resource exclusion, the terminal device 11 reports the fourth candidate resource set to a higher layer (for example, a MAC layer). In addition, the terminal device 11 further reports the second candidate resource set to the higher layer. Then, the higher layer of the terminal device 11 determines, from the fourth candidate resource set and the second candidate resource set based on the priority corresponding to the fourth candidate resource set and the priority corresponding to the second candidate resource set, the resource for transmitting information.

Optionally, the priority corresponding to the fourth candidate resource set and the priority corresponding to the second candidate resource set may be represented as follows: The priority corresponding to the fourth candidate resource set is higher than the priority corresponding to the second candidate resource set. It may be understood that a time domain resource in the fourth candidate resource set is preferentially selected as a resource for transmitting information.

For example, after determining, based on a result of the monitoring, that all time domain resources in the third candidate resource set are reserved by another device, or after determining, in performing a re-evaluation or preemption monitoring procedure, that the entire third candidate resource set is reserved by another device, the terminal device 11 determines, from the second candidate resource set, a resource for transmitting information. It may be understood that the fourth candidate resource set in the foregoing example is an empty set.

In still another example, the higher layer of the terminal device 11 first selects, from the fourth candidate resource set in a specific order, a resource for transmitting information, and if a quantity of resources in the fourth candidate resource set is insufficient for transmitting information, selects, from the second candidate resource set, a resource for transmitting information.

In another possible implementation, after the fourth candidate resource set is determined, the method further includes the following step.

S505b: The terminal device 11 determines, from the fourth candidate resource set and a second candidate resource set based on a probability corresponding to the fourth candidate resource set and a probability corresponding to the second candidate resource set, a resource for transmitting information.

For example, after completing resource exclusion, the terminal device 11 reports the fourth candidate resource set to a higher layer (for example, a MAC layer). In addition, the terminal device 11 further reports the second candidate resource set to the higher layer. Then, the higher layer of the terminal device 11 determines, from the fourth candidate resource set and the second candidate resource based on the probability corresponding to the fourth candidate resource and the probability corresponding to the second candidate resource, the resource for transmitting information.

In a possible implementation, the probability corresponding to the fourth candidate resource set may be a probability that a candidate resource in the fourth candidate resource set is for transmitting information, and the probability corresponding to the second candidate resource set may be a probability that a candidate resource in the second candidate resource set is for transmitting information.

For example, it is assumed that the probability corresponding to the fourth candidate resource set is 0.8, and the probability corresponding to the second candidate resource set is 0.1. In this case, a set (that is, the fourth candidate resource set or the second candidate resource set) in which a resource for transmitting information is located may be first determined from the fourth candidate resource set and the second candidate resource set based on the foregoing probabilities. It is assumed that the set in which the resource for transmitting information is located is the fourth candidate resource set, and the resource for transmitting information continues to be determined from the fourth candidate resource set.

In another possible implementation, the probability corresponding to the fourth candidate resource set may be probabilities that respectively correspond to candidate resources in the fourth candidate resource set and that the candidate resources are for transmitting information when the fourth candidate resource set is for transmitting information, and the probability corresponding to the second candidate resource set may be probabilities that respectively correspond to candidate resources in the second candidate resource set and that the candidate resources are for transmitting information when the second candidate resource set is for transmitting information.

For example, it is assumed that the probability corresponding to the fourth candidate resource set is 0.1, where the fourth candidate resource set includes nine candidate resources; and the probability corresponding to the second candidate resource set is 0.01, where the second candidate resource set includes 10 candidate resources. In other words, a probability that each candidate resource in the nine candidate resources included in the fourth candidate resource set is for transmitting information is 0.1, and a probability that each candidate resource in the 10 candidate resources included in the second candidate resource set is for transmitting information is 0.01. Then, a resource for transmitting information may be first selected from the fourth candidate resource set and the second candidate resource set based on the foregoing probabilities.

For example, the higher layer of the terminal device 11 selects, from the fourth candidate resource set and the second candidate resource set respectively based on a probability Pro1 and a probability Pro2, a resource for transmitting information.

In still another possible implementation, after the fourth candidate resource set is determined, the method further includes the following step.

S505c: The terminal device 11 determines, from the fourth candidate resource set, a resource for transmitting information.

After the resource for transmitting information is determined, the information may be transmitted by using the resource. Specifically, for a process of transmitting information by using a resource pair, refer to the related conventional technology. Details are not described in this application again.

It may be understood that, in embodiments of this application, the terminal device may perform some or all of the steps in embodiments of this application. The steps or operations are merely examples. In embodiments of this application, other operations or variants of various operations may be further performed. In addition, the steps may be performed in a sequence different from a sequence presented in embodiments of this application, and not all the operations in embodiments of this application may be performed. Embodiments provided in this application may be associated, and may be mutually referenced or cited.

The solutions provided in embodiments of this application are described mainly from a perspective of the terminal device in the foregoing embodiments. It should be understood that, to implement corresponding functions, the terminal device includes corresponding hardware structures and/or software modules for implementing the functions. A person of ordinary skill in the art should easily be aware that, in combination with the units in the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal device may be divided into function modules based on the foregoing method examples, for example, each function module may be obtained through division based on each corresponding function, or two or more functions may be integrated into one processing module. The integrated module may be implemented in a form of hardware, or may be implemented in a form of a software functional module. Optionally, in embodiments of this application, division into modules is used as an example, and is merely logical function division. In actual implementation, another division manner may be used.

FIG. 20 is a schematic diagram of composition of an apparatus 60 for determining a sidelink transmission resource according to an embodiment of this application. The apparatus 60 for determining a sidelink transmission resource may be a chip or a system on chip in a terminal device. The apparatus 60 for determining a sidelink transmission resource may be configured to implement functions of the terminal device in the foregoing embodiments. In a possible implementation, the apparatus 60 for determining a sidelink transmission resource includes a processing unit 601 and a transceiver unit 602.

The processing unit 601 is configured to determine a first time domain resource set in a resource selection window.

The transceiver unit 602 is configured to monitor a second time domain resource set corresponding to the first time domain resource set.

The processing unit 601 is configured to perform resource exclusion and/or resource reporting before a time unit of a first candidate resource, or in the time unit of the first candidate resource, or in a time unit in which resource determining is triggered.

The first time domain resource set is for sidelink transmission, and the first candidate resource is the is resource in time domain in the first time domain resource set.

In a possible design, the transceiver unit 602 is specifically configured to perform monitoring in first duration, where the first duration T' meets the following relationship:

$$T_{y1}-m \leq T' < n-P_0, \text{ where}$$

$T_{y1}$ is the time unit of the first candidate resource, m is a preconfigured parameter or a parameter determined through configuration signaling, n is the time unit in which resource determining is triggered, and $P_0$ is first preset duration.

In a possible design, the transceiver unit 602 is specifically configured to perform monitoring in second duration, and the second duration T'' meets the following relationship:

$$T_{y1}-m \leq T'' < T_{y1}-P_1, \text{ where}$$

$T_{y1}$ is the time unit of the first candidate resource, m is a preconfigured parameter or a parameter determined through configuration signaling, and $P_1$ is a second preset duration.

In a possible design, that the processing unit 601 is specifically configured to perform resource exclusion and/or resource reporting before a time unit of a first candidate resource includes: performing resource exclusion and/or resource reporting in a time unit $T_{y1}-P_2$, where $T_{y1}$ is the time unit of the first candidate resource, and $P_2$ is third preset duration.

FIG. 21 is a schematic diagram of composition of an apparatus 70 for determining a sidelink transmission resource according to an embodiment of this application. The apparatus 70 for determining a sidelink transmission resource may be a chip or a system on chip in a terminal device. The apparatus 70 for determining a sidelink transmission resource may be configured to implement functions of the terminal device in the foregoing embodiments. In a possible implementation, the apparatus 70 for determining a sidelink transmission resource includes a processing unit 701 and a transceiver unit 702.

The processing unit 701 is configured to determine a first time domain resource set in a resource selection window.

The transceiver unit 702 is configured to monitor a second time domain resource set corresponding to the first time domain resource set, where the second time domain resource set is located before the first time domain resource.

The first time domain resource set is for sidelink transmission.

In a possible design, the transceiver unit 702 is further configured to end the monitoring before a time unit n for triggering resource determining.

In a possible design, the first time domain resource set is located before a third time domain resource, and the third time domain resource is located after the time unit in which resource determining is triggered with an interval of fourth preset duration from the time unit in which resource determining is triggered.

In a possible design, the transceiver unit 702 is specifically configured to perform monitoring in first duration, where the first duration T' meets the following relationship:

$$T_{y1}-m \leq T' < n-P_0, \text{ where}$$

$T_{y1}$ is a time unit of a first candidate resource, the first candidate resource is the $1^{st}$ resource in time domain in the first time domain resource set, m is a preconfigured parameter or a parameter determined through configuration signaling, n is a time unit in which resource determining is triggered, and $P_0$ is first preset duration.

In a possible design, the transceiver unit 702 is further configured to end the monitoring before the time unit of the first candidate resource.

In a possible design, the first time domain resource set is located before a fourth time domain resource, the fourth time domain resource is located after the first candidate resource with an interval of fifth preset duration from the first candidate resource, and the first candidate resource is the is resource in time domain in the first time domain resource set.

In a possible design, the transceiver unit 702 is specifically configured to perform monitoring in second duration, and the second duration T'' meets the following relationship:

$$T_{y1}-m \leq T'' < T_{y1}-P_1, \text{ where}$$

$T_{y1}$ is a time unit of a first candidate resource, the first candidate resource is the $1^{st}$ resource in time domain in the first time domain resource set, m is a preconfigured parameter or a parameter determined through configuration signaling, and $P_1$ is second preset duration.

FIG. 22 is a schematic diagram of composition of an apparatus 80 for determining a sidelink transmission resource according to an embodiment of this application. The apparatus 80 for determining a sidelink transmission resource may be a chip or a system on chip in a terminal device. The apparatus 80 for determining a sidelink transmission resource may be configured to implement functions of the terminal device in the foregoing embodiments. In a possible implementation, the apparatus 80 for determining a sidelink transmission resource includes a processing unit 801 and a transceiver unit 802.

The processing unit 801 is configured to determine a first time domain resource set in a resource selection window.

The processing unit 801 is configured to exclude, when the first monitoring resource is after a moment n for triggering resource determining or after a first candidate resource, a second candidate resource corresponding to the first monitoring resource from the first time domain resource set.

The transceiver unit 802 is configured to monitor a second time domain resource set corresponding to remaining time domain resources in the first time domain resource set.

The first time domain resource set is for sidelink transmission, and the first candidate resource is the $1^{st}$ resource in time domain in the first time domain resource set.

In a possible design, the processing unit 801 is further configured to determine a fourth candidate resource set from a third candidate resource set based on a result of the monitoring, where the third candidate resource set is a set of the remaining time domain resources.

The processing unit 801 is further configured to determine, from the fourth candidate resource set and a second candidate resource set based on a priority corresponding to the fourth candidate resource set and a priority corresponding to the second candidate resource set, a resource for transmitting information.

Alternatively, the processing unit 801 is further configured to determine, from the fourth candidate resource set and a second candidate resource set based on a probability corresponding to the fourth candidate resource set and a probability corresponding to the second candidate resource set, a resource for transmitting information.

It may be understood that, for detailed descriptions of functions of the units in the foregoing apparatuses 60 to 80 for determining a sidelink transmission resource, refer to the method embodiments, for example, descriptions of related steps performed by the corresponding terminal device 11 in embodiments shown in FIG. 9, FIG. 15, and FIG. 18. Details are not described herein again.

When an integrated unit is used, FIG. 23 is a schematic diagram of a structure of an apparatus for determining a sidelink transmission resource included in the foregoing embodiments. The apparatus 90 for determining a sidelink transmission resource may include a processing module 901 and a communication module 902. Optionally, the apparatus 90 for determining a sidelink transmission resource further includes a storage module 903. The processing module 901 is configured to control and manage an action of the apparatus 90 for determining a sidelink transmission resource. For example, the processing module 901 is configured to perform the step of information/data processing performed by the apparatus 90 for determining a sidelink transmission resource, to enable the apparatus 90 for determining a sidelink transmission resource to implement a function of the terminal device in the method provided in the foregoing embodiments.

The communication module 902 is configured to support the apparatus 90 for determining a sidelink transmission resource in performing an information/data sending or receiving step. The storage module 903 is configured to store program code and data of an apparatus for sending a sidelink resource.

For example, in some embodiments, the processing module 901 is configured to perform S301 and S303 in FIG. 9. The communication module 902 is configured to perform S302 in FIG. 9.

In addition, in some embodiments, the processing module 901 is further configured to perform S401 in FIG. 15. The communication module 902 is configured to perform S402 in FIG. 15.

In another example, in some embodiments, the processing module 901 is configured to perform S501, S502, S504, and S505 in FIG. 18. The communication module 902 is configured to perform S503 in FIG. 15.

The processing module 901 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication module 902 may be a transceiver, a transceiver circuit, a communication interface, or the like. The storage module 903 may be a memory.

When the processing module 901 is a processor 21 or a processor 25, the communication module 902 is a transceiver 23, and the storage module 903 is a memory 22, the apparatus for sending a sidelink resource in this application may be a communication device shown in FIG. 7.

In a possible embodiment, the communication device shown in FIG. 7 is a terminal device, or is an apparatus for determining a sidelink transmission resource that is applied to a terminal device.

FIG. 24 is a schematic diagram of a structure of an apparatus for determining a sidelink transmission resource. The apparatus may be a chip 100. The chip 100 includes one or more processors 1001 and an interface circuit 1002. Optionally, the chip 100 may further include a bus 1003.

The processor 1001 may be an integrated circuit chip and has a signal processing capability. In an implementation process, steps in the foregoing method 200 may be implemented through an integrated logic circuit of hardware in the processor 1001, or through instructions in a form of software.

Optionally, the processor 1001 may be a general-purpose processor, a DSP, an ASIC, an FPGA or another programmable logic device, a discrete gate or transistor logic device, or a discrete hardware component. The processor may implement or perform the methods and steps that are disclosed in embodiments of this application. The general-purpose processor may be a microprocessor, or the processor may be any conventional processor or the like.

The interface circuit 1002 may be configured to communicate with another apparatus. For example, the interface circuit 1002 may be configured to send or receive data, instructions, or information. The processor 1001 may process data, instructions, or other information received through the interface circuit 1002, and send, through the interface circuit 1002, information obtained after processing.

For example, when the chip 100 is configured to implement a function of a first node in the foregoing method, the foregoing another apparatus may be a second node or an apparatus in the second node (for example, a data transmission apparatus in the second node) in the foregoing embodiments.

In another example, when the chip 100 is configured to implement a function of a second node in the foregoing method, the foregoing another apparatus may be a first node or an apparatus in the first node (for example, a data transmission apparatus in the first node) in the foregoing embodiments.

Optionally, the chip further includes a memory. The memory may include a read-only memory and a random access memory, and provide operation instructions and data for the processor. A part of the memory may further include a non-volatile random access memory (non-volatile random access memory, NVRAM).

Optionally, the memory stores an executable software module or a data structure, and the processor may perform a corresponding operation by invoking operation instructions (the operation instructions may be stored in an operating system) stored in the memory.

Optionally, the chip may be used in the first control apparatus, the second control apparatus, or the terminal device in embodiments of this application. Optionally, the interface circuit 1002 may be configured to output an execution result of the processor 1001. For the data transmission method provided in one or more embodiments of this application, refer to the foregoing embodiments. Details are not described herein again.

It should be noted that functions respectively corresponding to the processor 1001 and the interface circuit 1002 may be implemented through a hardware design, may be implemented through a software design, or may be implemented in a combination of software and hardware. This is not limited herein.

In a possible implementation, the interface circuit 1002 is configured to perform monitoring step of the terminal device 11 in embodiments shown in FIG. 9, FIG. 15, and FIG. 18. The processor 1510 is configured to perform the processing steps of the terminal device 11 in embodiments shown in FIG. 9, FIG. 15, and FIG. 18.

In addition, an embodiment of this application may provide a computer-readable storage medium. The computer-readable storage medium stores instructions. When the instructions are run, functions of the terminal device 11 in any one of FIG. 9, FIG. 15, and FIG. 18 are implemented.

An embodiment of this application provides a computer program product including instructions. The computer program product includes the instructions, and when the instructions are run, functions of the terminal device 11 in any one of FIG. 9, FIG. 15, and FIG. 18 are implemented.

An embodiment of this application provides a communication system. The communication system includes the foregoing apparatus for determining a sidelink transmission resource and a network device.

All or a part of functions, actions, operations, steps, and the like in the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:

determining a first time domain resource set in a resource selection window; and monitoring a second time domain resource set corresponding to the first time domain resource set, wherein the second time domain resource set is located before the first time domain resource set, and wherein the first time domain resource set is configured for sidelink transmission; and wherein monitoring the second time domain resource set corresponding to the first time domain resource set comprises:

performing monitoring in a duration T", wherein the duration T" meets the following relationship:

$T_{y1}-m \le T"< T_{y1}-P_1$, wherein $T_{y1}$ is a time unit of a first candidate resource, the first candidate resource is an earliest resource in time domain in the first time domain resource set, m is a parameter, and $P_1$ is a preset duration.

2. The method according to claim 1, wherein m is 31.

3. The method according to claim 1, wherein m is a logical interval including only a quantity of time units in a sidelink resource pool.

4. The method according to claim 1, wherein m is a quantity of logical slots.

5. The method according to claim 1, wherein $P_1 = T_{proc,0} + T_{proc,1}$, $T_{proc,0}$ is a processing time required for performing sidelink control information (SCI) decoding, $T_{proc,1}$ is a sum of a processing time required for a higher layer to complete a final resource selection procedure and a processing time required for preparing to-be-transmitted information.

6. The method according to claim 1, wherein a value of m is configured through radio resource control (RRC) signaling.

7. The method according to claim 1, wherein the method is performed by a terminal device or a chip in a terminal device.

8. A communication apparatus, comprising:

one or more processors; and a memory, wherein the memory stores a computer program, and when executing the computer program stored in the memory, the one or more processors execute operations comprising:

determining a first time domain resource set in a resource selection window; and monitoring a second time domain resource set corresponding to the first time domain resource set, wherein the second time domain resource set is located before the first time domain resource set, and wherein the first time domain resource set is configured for sidelink transmission; and wherein monitoring the second time domain resource set corresponding to the first time domain resource set comprises:

performing monitoring in a duration T", wherein the duration T" meets the following relationship:

$T_{y1}-m \leq T"<T_{y1}-P_1$, wherein $T_{y1}$ is a time unit of a first candidate resource, the first candidate resource is an earliest resource in time domain in the first time domain resource set, m is a parameter, and P is a preset duration.

9. The communication apparatus according to claim 8, wherein m is 31.

10. The communication apparatus according to claim 8, wherein m is a logical interval including only a quantity of time units in a sidelink resource pool.

11. The communication apparatus according to claim 8, wherein m is a quantity of logical slots.

12. The communication apparatus according to claim 8, wherein $P_1=T_{proc,0}+T_{proc,1}$, $T_{proc,0}$ is a processing time required for performing sidelink control information (SCI) decoding, $T_{proc,1}$ is a sum of a processing time required for a higher layer to complete a final resource selection procedure and a processing time required for preparing to-be-transmitted information.

13. The communication apparatus according to claim 8, wherein a value of m is configured through radio resource control (RRC) signaling.

14. The communication apparatus according to claim 8, wherein the communication apparatus is a terminal device or a chip in a terminal device.

15. A non-transitory computer-readable storage medium, comprising:

executable instructions, wherein the executable instructions, when executed by one or more processors of an apparatus, cause the apparatus to execute operations comprising:

determining a first time domain resource set in a resource selection window; and monitoring a second time domain resource set corresponding to the first time domain resource set, wherein the second time domain resource set is located before the first time domain resource set, and wherein the first time domain resource set is configured for sidelink transmission; and wherein monitoring the second time domain resource set corresponding to the first time domain resource set comprises:

performing monitoring in a duration T", wherein the duration T" meets the following relationship:

$T_{y1}-m \leq T"<T_{y1}-P_1$, wherein $T_{y1}$ is a time unit of a first candidate resource, the first candidate resource is an earliest resource in time domain in the first time domain resource set, m is a parameter, and $P_1$ is a preset duration.

16. The non-transitory computer-readable storage medium according to claim 15, wherein m is 31.

17. The non-transitory computer-readable storage medium according to claim 15, wherein m is a logical interval including only a quantity of time units in a sidelink resource pool.

18. The non-transitory computer-readable storage medium according to claim 15, wherein m is a quantity of logical slots.

19. The non-transitory computer-readable storage medium according to claim 15, wherein $P_1=T_{proc,0}+T_{proc,1}$, $T_{proc,0}$ is a processing time required for performing sidelink control information (SCI) decoding, $T_{proc,1}$ is a sum of a processing time required for a higher layer to complete a final resource selection procedure and a processing time required for preparing to-be-transmitted information.

20. The non-transitory computer-readable storage medium according to claim 15, wherein a value of m is configured through radio resource control (RRC) signaling.

* * * * *